US010817866B2

(12) United States Patent
McElmurry et al.

(10) Patent No.: US 10,817,866 B2
(45) Date of Patent: Oct. 27, 2020

(54) SENDING AND RECEIVING PAYMENTS USING A MESSAGE SYSTEM

(71) Applicant: Facebook, Inc., Menlo Park, CA (US)

(72) Inventors: Roy Vance McElmurry, Seattle, WA (US); Jonathan B. Gheller, Menlo Park, CA (US); Alex Chao Qin, Mountain View, CA (US); Kevin Patrick Hurley, Menlo Park, CA (US); Reinardus Surya Pradhitya, Menlo Park, CA (US); Dipanshu Agrawal, Menlo Park, CA (US); Shengling Hu, Palo Alto, CA (US); Chirag Chhagan Chheda, Mountain View, CA (US); Yegnashankar Parasuram, Cupertino, CA (US); Martin Kralik, Redwood City, CA (US)

(73) Assignee: FACEBOOK, INC., Menlo Park, CA (US)

( * ) Notice: Subject to any disclaimer, the term of this patent is extended or adjusted under 35 U.S.C. 154(b) by 162 days.

(21) Appl. No.: 16/189,928

(22) Filed: Nov. 13, 2018

(65) Prior Publication Data

US 2019/0087811 A1 Mar. 21, 2019

Related U.S. Application Data

(63) Continuation of application No. 14/572,495, filed on Dec. 16, 2014, now Pat. No. 10,127,544.

(51) Int. Cl.
*G06Q 20/32* (2012.01)
*G06Q 20/10* (2012.01)
(Continued)

(52) U.S. Cl.
CPC ......... *G06Q 20/3255* (2013.01); *G06Q 20/10* (2013.01); *G06Q 20/223* (2013.01); *G06Q 20/32* (2013.01); *G06Q 50/01* (2013.01)

(58) Field of Classification Search
None
See application file for complete search history.

(56) References Cited

U.S. PATENT DOCUMENTS 8,942,999 B1  1/2015  Fernando et al.
10,127,544 B2  11/2018  McElmurry
(Continued)

FOREIGN PATENT DOCUMENTS

CN  103186851 A  7/2013
CN  103186861 A  7/2013
(Continued)

OTHER PUBLICATIONS

Office Action as received in Chinese Application 201480084121.7 dated Apr. 8, 2020 [no English translation available].
(Continued)

*Primary Examiner* — Joseph W. King
*Assistant Examiner* — Amit Patel
(74) *Attorney, Agent, or Firm* — Keller Jolley Preece

(57) ABSTRACT

The present disclosure relates to systems, methods, and devices that provide a transactional payment system. In particular, the transactional payment system allows users of a messaging system to send and receive electronic payments to and from other users of the messaging system. A messaging application on a client device can receive payment information input (such as a payment amount and payment method) from a sender for making a payment to a recipient. The messaging application can send a payment message including the payment information to a messaging system, and the messaging system coordinates a payment process
(Continued)

based on the payment information. During the payment process, the messaging system can provide status updates to the sender and receiver of the payment via status messages that are included in a message thread corresponding to the sender and the recipient.

20 Claims, 18 Drawing Sheets

(51) Int. Cl.
  *G06Q 20/22* (2012.01)
  *G06Q 50/00* (2012.01)

(56) References Cited

U.S. PATENT DOCUMENTS

| | | |
|---|---|---|
| 2007/0011104 A1 | 1/2007 | Leger et al. |
| 2007/0255662 A1 | 11/2007 | Tumminaro |
| 2012/0143761 A1 | 6/2012 | Doran et al. |
| 2013/0219289 A1 | 8/2013 | Anton et al. |
| 2013/0275222 A1 | 10/2013 | Amaro et al. |
| 2013/0297493 A1 | 11/2013 | Linden et al. |
| 2014/0052633 A1 | 2/2014 | Gandhi |
| 2014/0172695 A1 | 6/2014 | Kanjlia et al. |
| 2014/0222664 A1 | 8/2014 | Milne |
| 2014/0279444 A1 | 9/2014 | Kassemi et al. |

FOREIGN PATENT DOCUMENTS

| | | |
|---|---|---|
| CN | 103392186 A | 11/2013 |
| CN | 104021489 A | 9/2014 |
| EP | 2779066 A1 | 9/2014 |
| JP | 2010108177 A | 5/2010 |
| JP | 2011503711 A | 1/2011 |
| JP | 2014508334 A | 4/2014 |
| JP | 2018504668 A | 2/2018 |
| WO | WO 2014/103046 | 7/2014 |
| WO | WO 2016/099493 | 6/2016 |

OTHER PUBLICATIONS

Appeal Preliminary Examination Report as received in Japanese Application 2017-528936 dated Jan. 15, 2020.
Office Action as received in European Application EP15162880.7 dated Apr. 17, 2019.
Search Report as received in Brazilian Application BR1120170128608 dated Apr. 13, 2020.
Akira Iizuka, "LINE announces new settlement service, 'LINE Pay,' Enabling remittances between individuals and bill split," posted on Oct. 9, 2014 to "Shopping Tribe" administered by Plaid, Inc., Japan. [Searched on Nov. 14, 2018], <URL: http://shopping-tribe.com/news/11331/>.
International Search Report as received in PCT/US2014/070967 dated Aug. 24, 2015.
Extended European Search Report as received in EP 15 162 880.7 dated Apr. 28, 2016.
Office Action as received in Japanese Application 2017-528936 dated Nov. 27, 2018.
Special Techniques for LINE and SNS—Part 02, Special Techniques for Smartphone—Best Selection, p. 15, published by Shinyusha Co., Ltd., Nov. 1, 2014. ISBN: 978-4- 8018-0054-0 (a reference indicating well-known art).
U.S. Appl. No. 14/572,495, Apr. 11, 2017, Preinterview 1st Office Action.
U.S. Appl. No. 14/572,495, May 25, 2017, 1st Action Office Action.
U.S. Appl. No. 14/572,495, Sep. 5, 2017, Office Action.
U.S. Appl. No. 14/572,495, Dec. 29, 2017, Office Action.
U.S. Appl. No. 14/572,495, Jul. 11, 2018, Notice of Allowance.
Preliminary Examination Report as received in Japanese Application 2017-528936 dated Jan. 15, 2020.
Office Action as received in Japanese Application 2017-528936 dated Jul. 16, 2019.

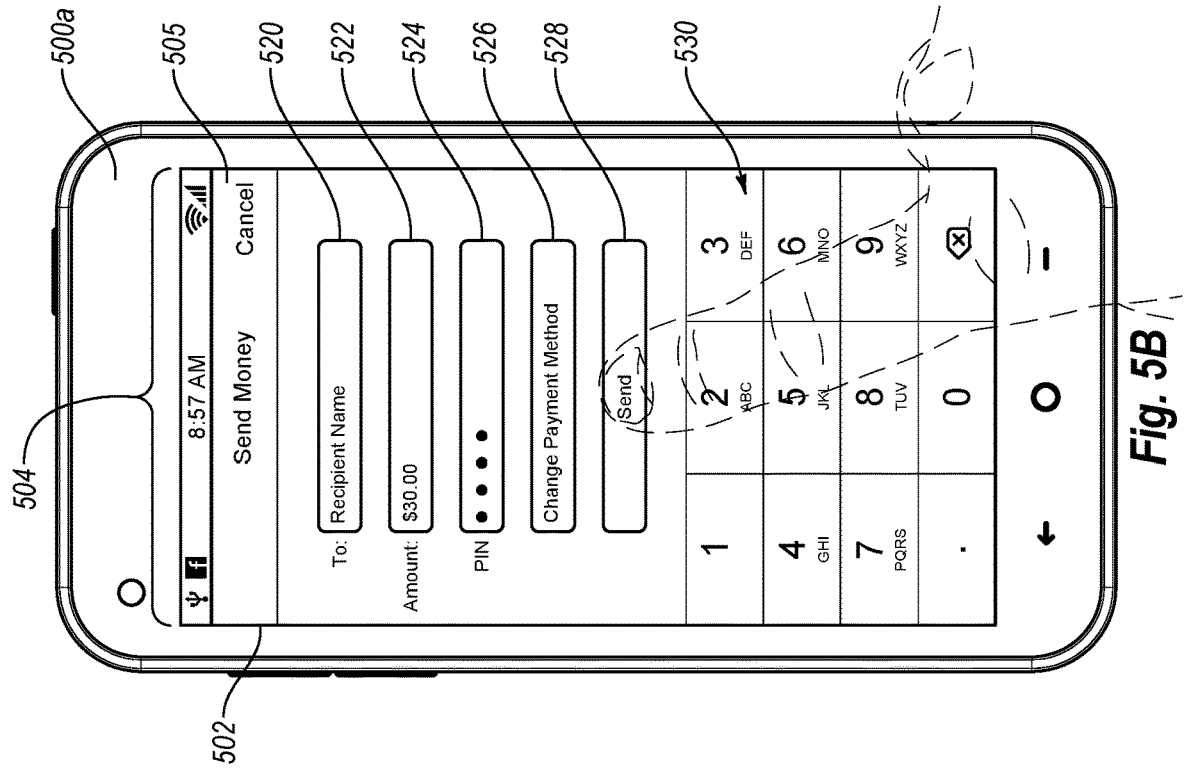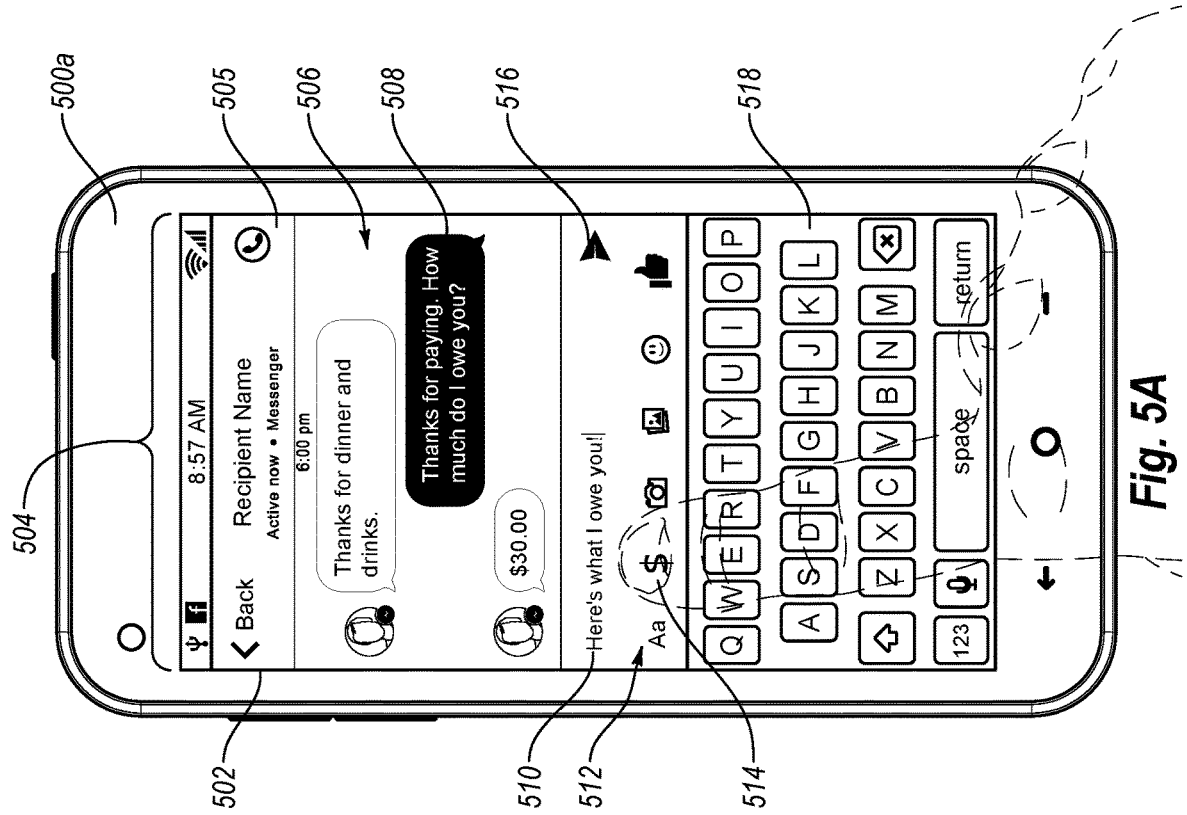
Fig. 5B
Fig. 5A

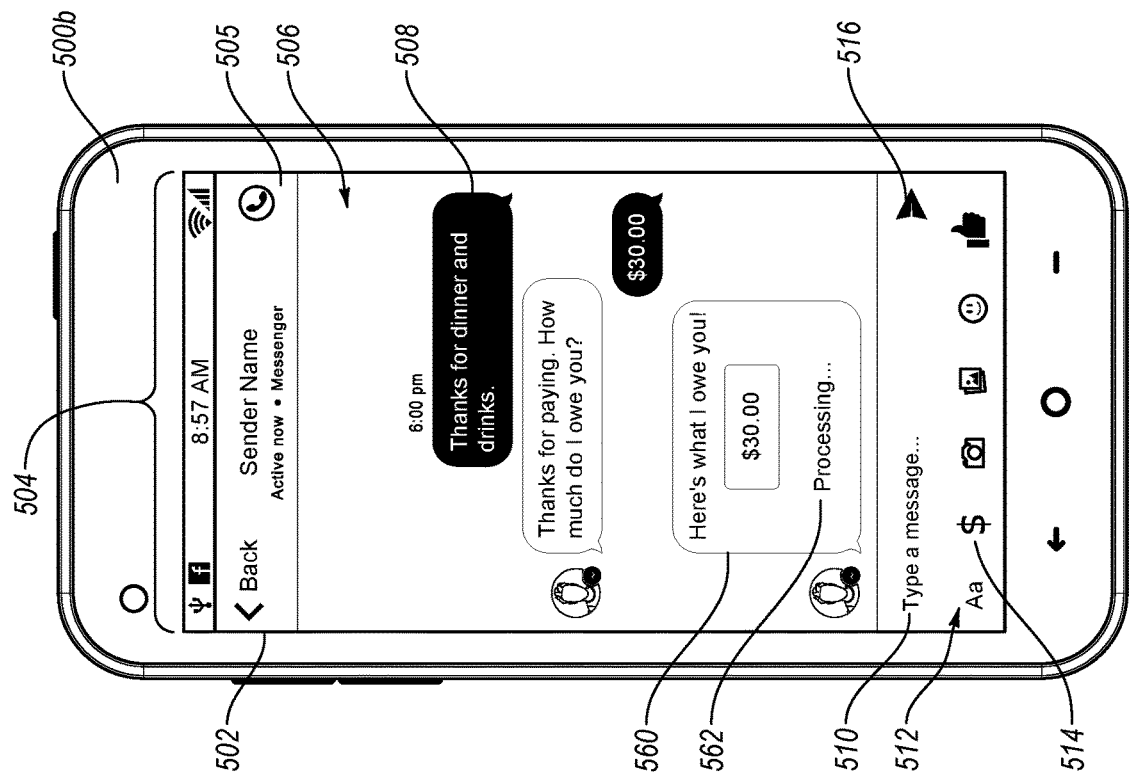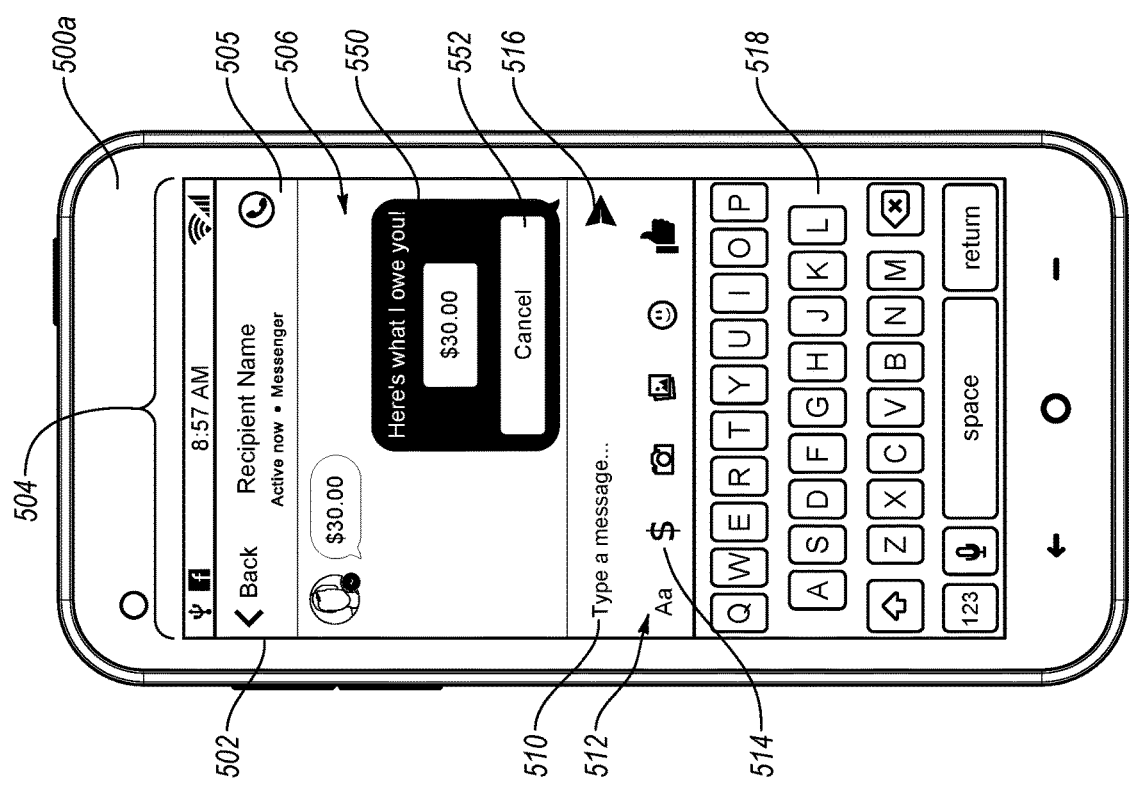

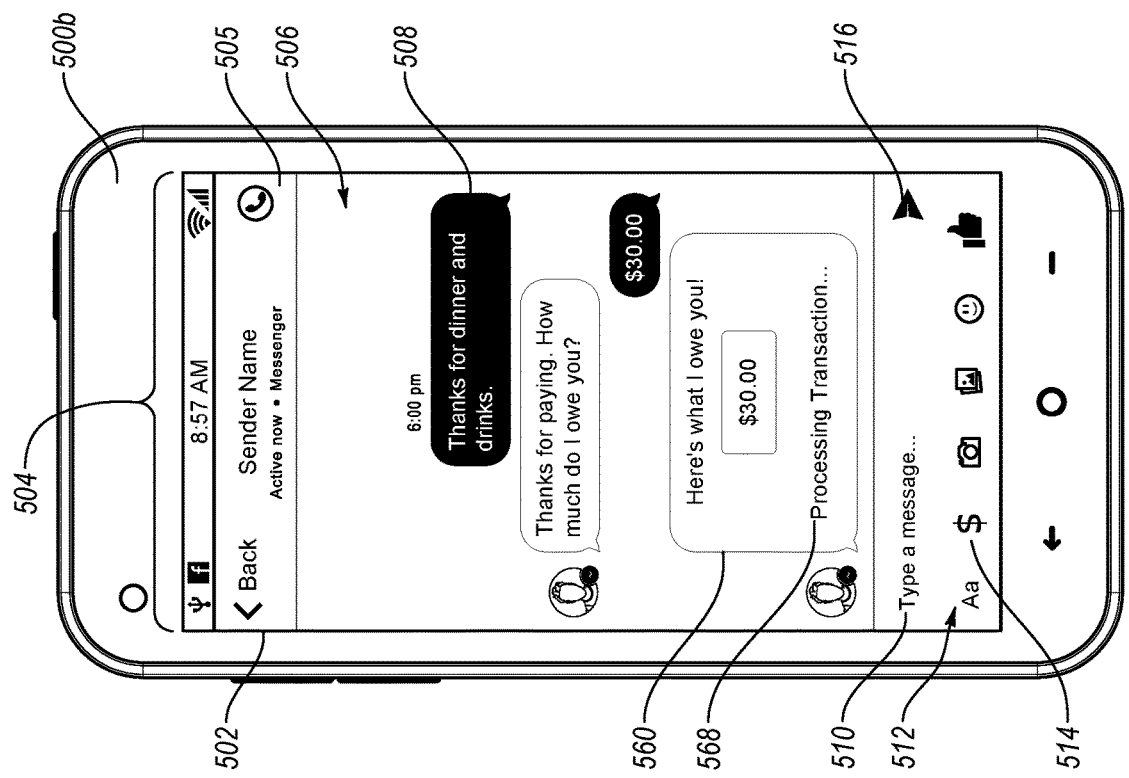
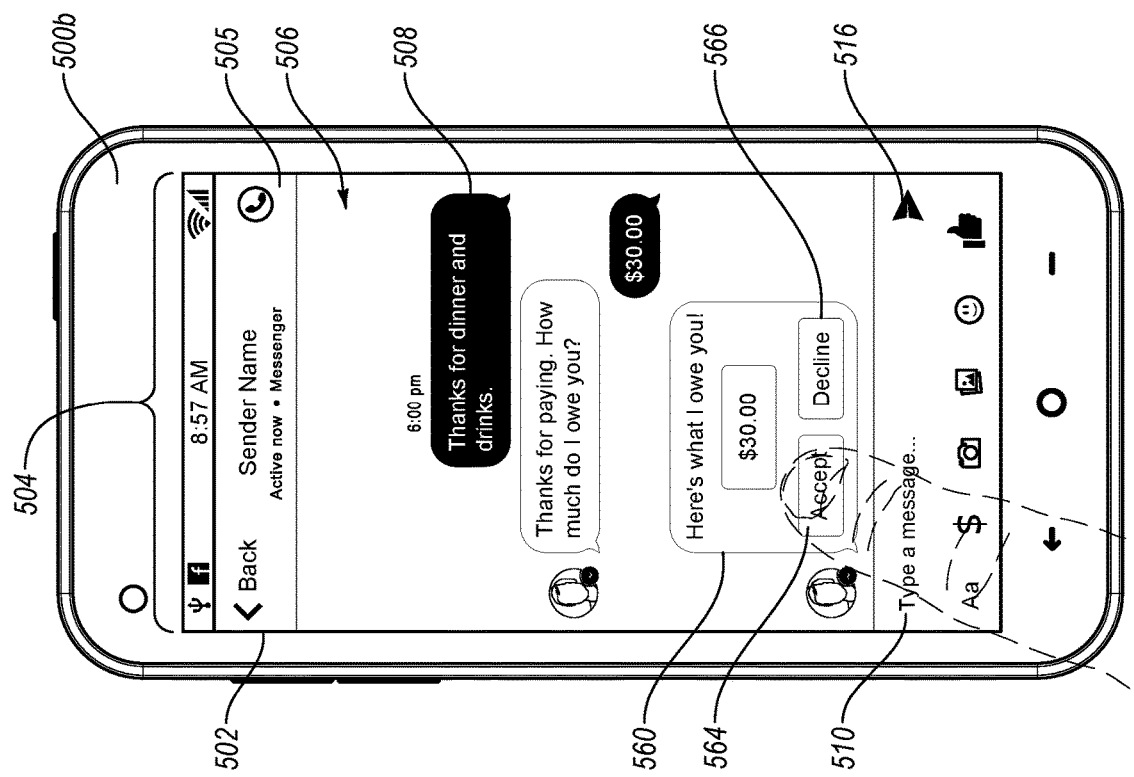

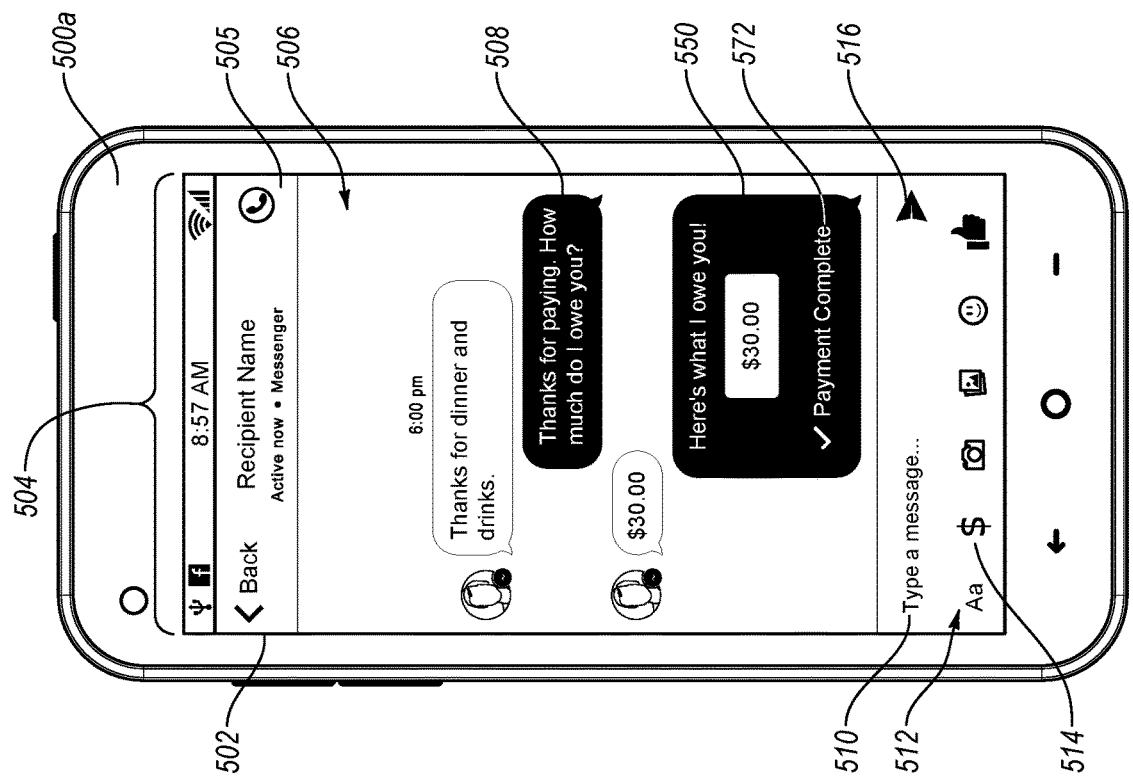
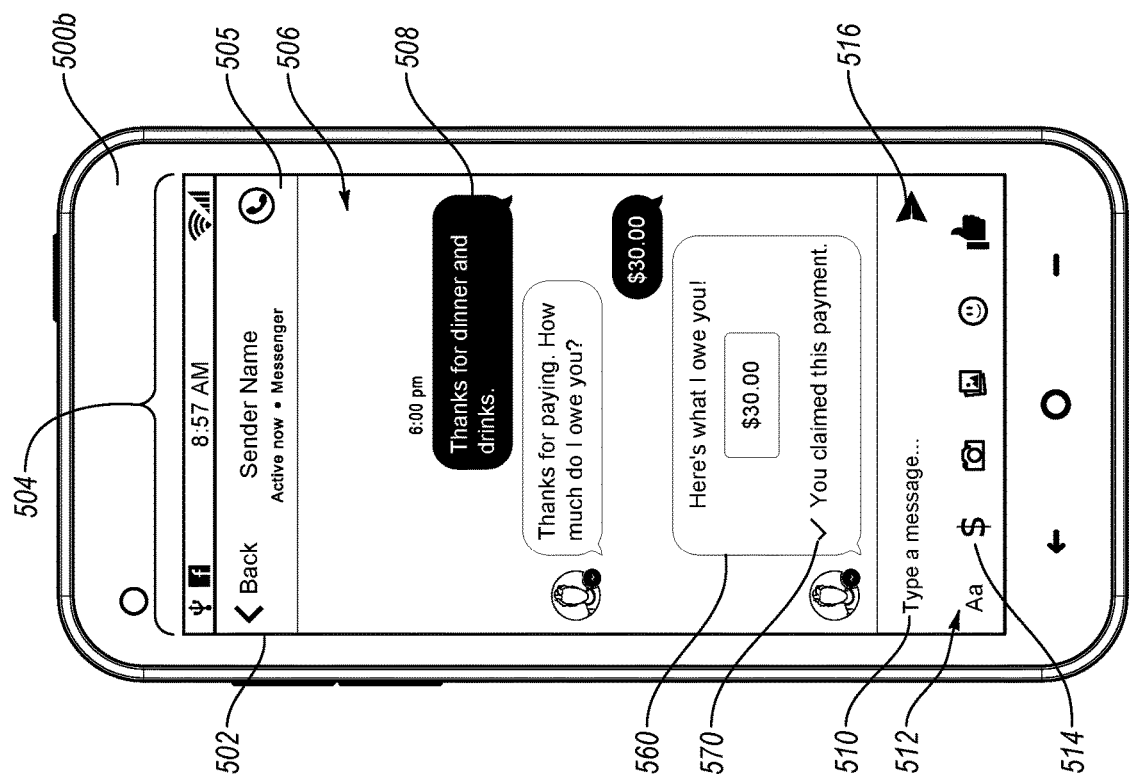
Fig. 5H
Fig. 5G

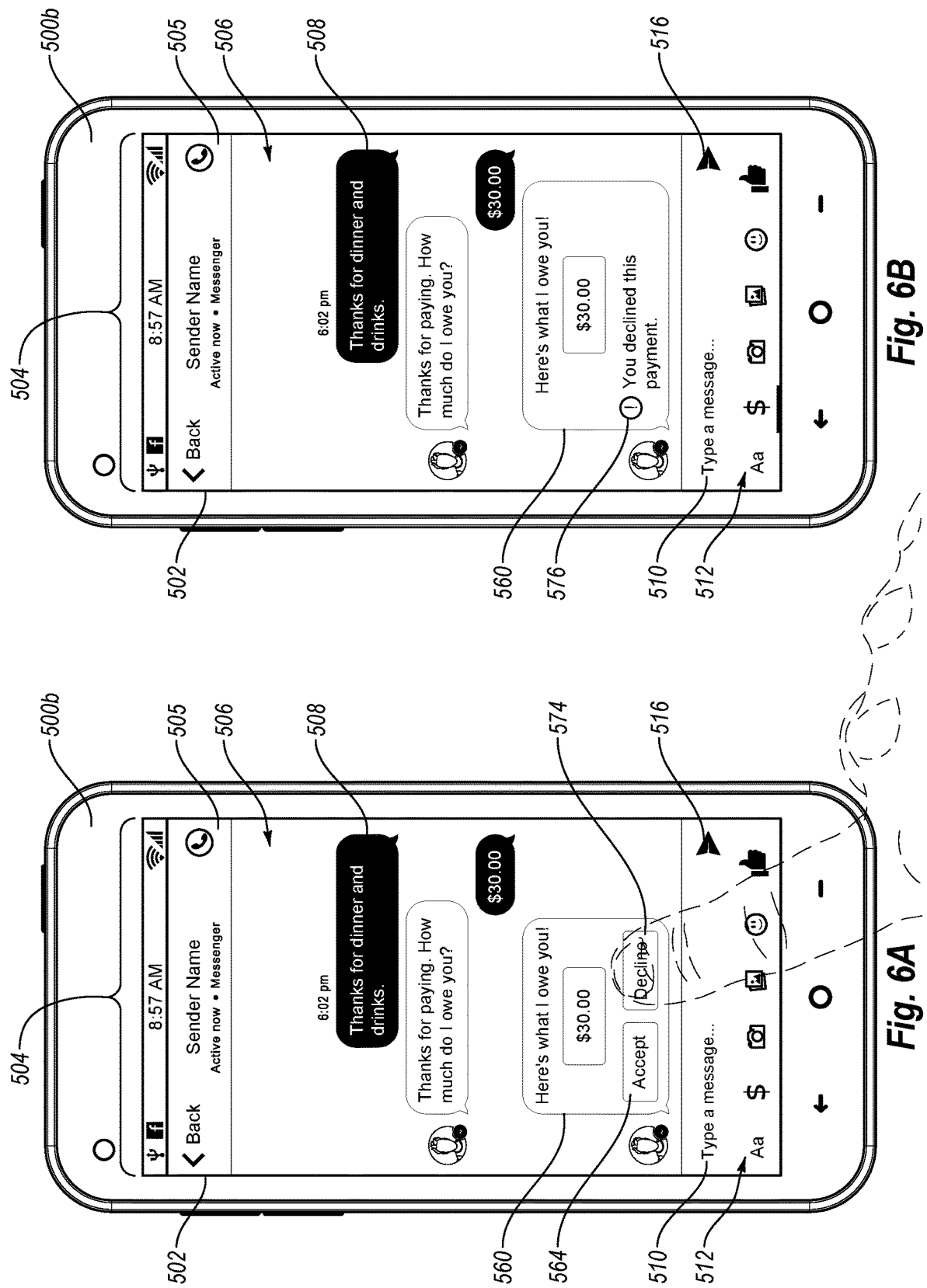

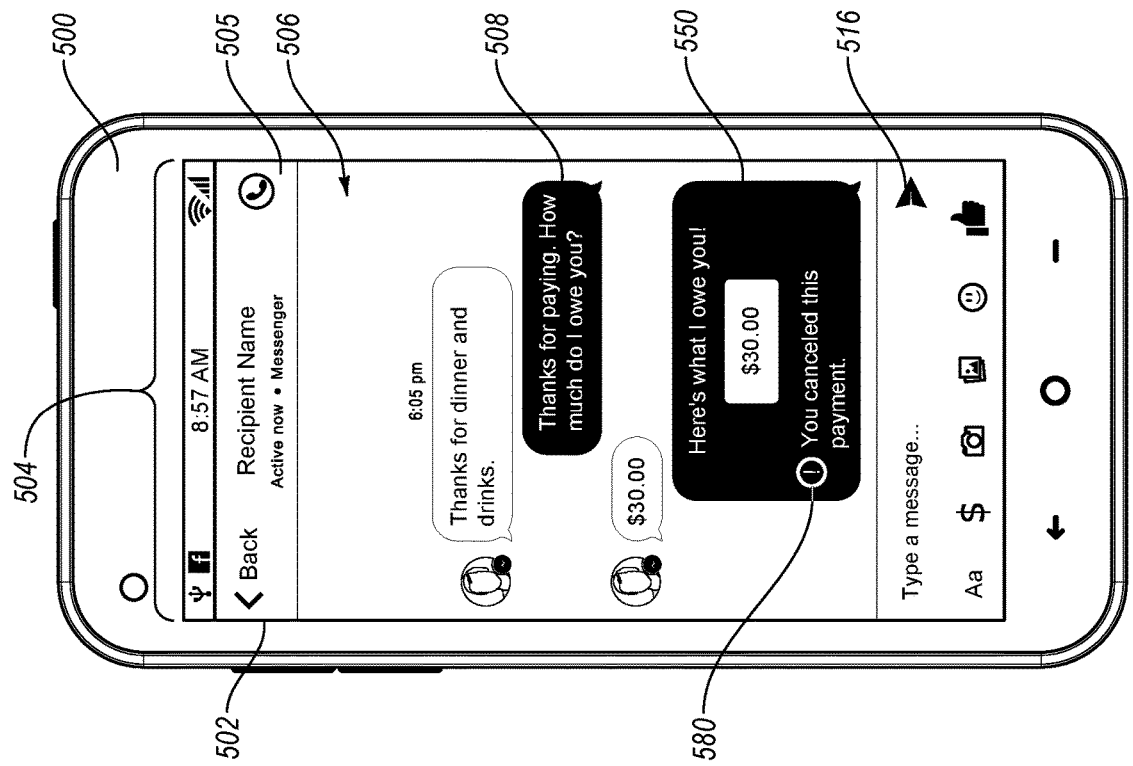
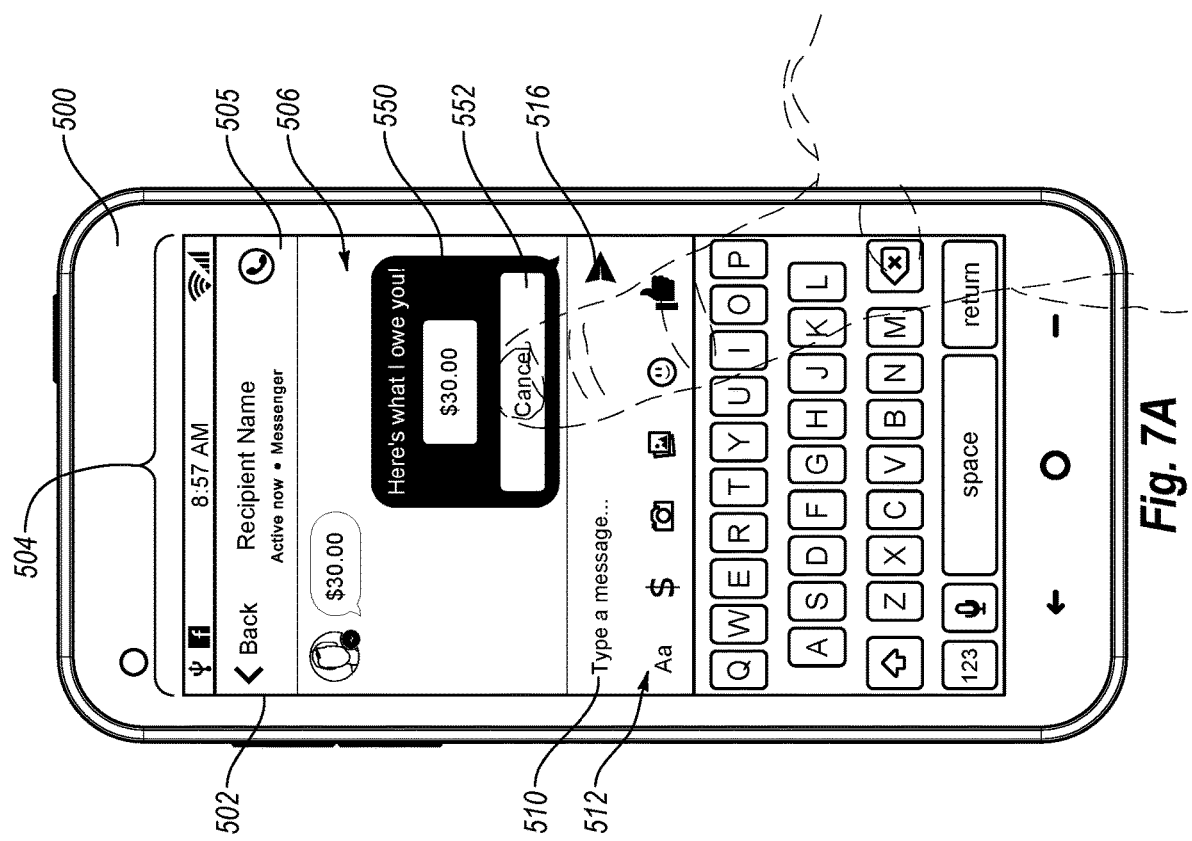
Fig. 7B
Fig. 7A

SENDING AND RECEIVING PAYMENTS USING A MESSAGE SYSTEM

CROSS REFERENCE TO RELATED APPLICATIONS

The present application is a continuation of U.S. application Ser. No. 14/572,495, filed Dec. 16, 2014. The aforementioned application is hereby incorporated by reference in its entirety.

BACKGROUND

1. Technical Field

One or more embodiments relate generally to systems and methods for providing electronic communication systems. More specifically, one or more embodiments relate to systems and methods of providing messaging systems that incorporate various forms of electronic communication between users.

2. Background and Relevant Art

Due to advances in electronic communication, the majority of people use various forms of electronic communication to communicate with other people. In addition, mobile devices (e.g., smart phones, tablets) have become increasingly popular, and allow people to send and receive electronic communications from almost anywhere. The popularity of electronic communication, in combination with the increase in mobile device usage, has lead to additional uses of the electronic communication technology.

For example, one such additional use of electronic communication technology includes payment applications that provide users the ability to send and receive electronic payments to one another. In theory, the concept of using a payment application on a mobile device to electronically transfer money provides a convenient method of transferring money between users. Conventional payment applications, however, have several drawbacks that often cause frustration, confusion, and result in a payment process that is often more time consuming than it is worth.

Many conventional payment applications require the use of card readers that connect to another computing device, such as a mobile device. The conventional payment applications that use a card reader have several disadvantages. For example, a user must carry and always have the card reader, in addition to the mobile device, in order to receive a payment. In addition, the card reader and the connection between the mobile device and card reader are often prone to failure. Card readers also lack public trust due to the ability of criminals to use card readers to steal sensitive credit card information. Furthermore, payment applications that require card readers are typically not suitable for processing remote payments.

Other conventional payment applications do not use card readers, but are standalone payment services in which both the sender and the recipient of the payment must create an account specifically for the payment service. Due to the fact that conventional payment applications have no other use outside of sending and receiving payments, it is often the case that two people are not needing to transfer a payment do not have an account for the same payment service. Thus, with many conventional payment applications, the sender, recipient, or both have to go through a time-consuming process of setting up an account, causing the payment process to be inconvenient and burdensome.

In addition to simply setting up an account associated with a particular payment application, the payment process that many conventional payment applications use is burdensome and complicated. For example, many conventional payment applications process a payment by sending a series of emails with links. Users must click on the email links to continue the payment process, such as accepting or denying a payment. Therefore, the payment processing steps are not intuitive and often cause user confusion. In addition, the processing steps are time-consuming and cause user frustration during the payment process.

Accordingly, there are a number of disadvantages with conventional systems and methods of sending payments between users.

SUMMARY

One or more embodiments described herein provide benefits and/or solve one or more of the foregoing or other problems in the art with systems and methods for electronically sending and receiving payments between users. In particular, the systems and methods provide a transactional payment system integrated with a messaging system that allows two or more users (at least a sender and a recipient) to securely send and receive an electronic payment via the messaging system. For example, the systems and methods can allow a user to send another user an electronic payment via a messaging interface used to send conventional instant messages (e.g., instant messages).

In one or more embodiments, for example, the systems and methods can provide a graphical interface to a sender user that includes a selectable option to send a payment to one or more recipients. A sender can interact with the selectable option to access one or more graphical elements that allow the user to input payment information and initiate a payment. Upon a user initiating a payment, the systems and methods can coordinate a payment process using the payment information received from the user. The payment process can ultimately facilitate a payment between the user and a recipient.

In one or more embodiments, the systems and methods additionally provide status messages within a messaging thread corresponding to a communication session between the sender and the recipient. The status messages allow the sender and the recipient to monitor the status of the payment process. In addition, the status messages can include interactive elements that provide selectable options with respect to the payment, such as allowing a recipient the option of accepting or denying the payment. Thus, the systems and methods described herein provide the ability for users to send and receive payments through the convenient use of messaging applications already familiar to messaging users.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which:

FIGS. 5A-5H illustrate an example of a messaging graphical interface used to process payments between a sender and a recipient in accordance with one or more embodiments;

FIGS. 6A-6C illustrate additional features of a messaging graphical interface used to process payments between a sender and a recipient in accordance with one or more embodiments;

FIGS. 7A-7C illustrate additional features of a messaging graphical interface used to process payments between a sender and a recipient in accordance with one or more embodiments;

DETAILED DESCRIPTION

Figure 1:
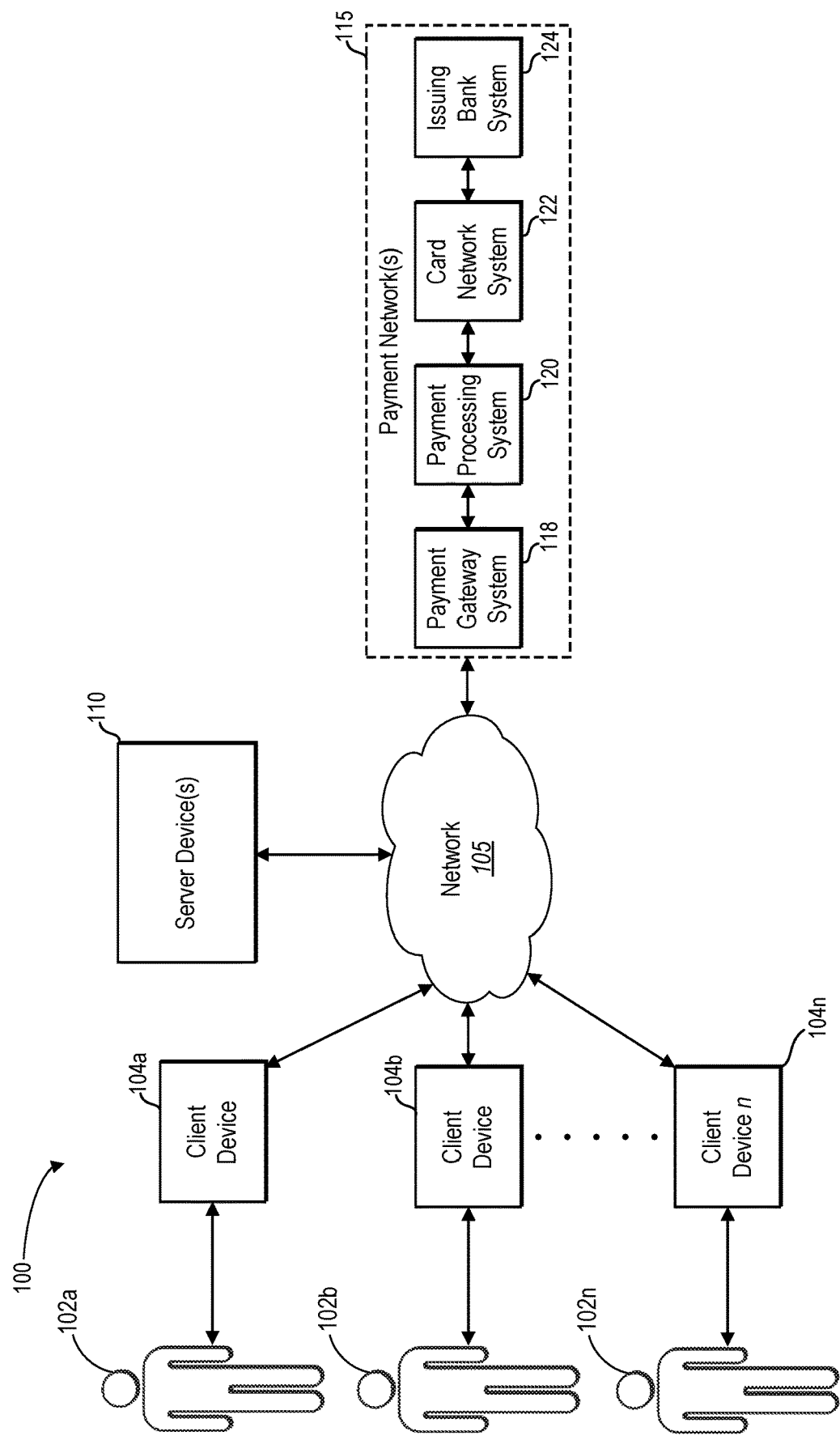
FIG. 1 illustrates a schematic diagram of an example system that facilitates the sending of payments in accordance with one or more embodiments.

Embodiments of the present disclosure provide a transactional payment system that increases the ease and efficiency of sending and receiving payments between parties to a transaction. In particular, one or more embodiments include a message system through which users can send and receive payment(s) to and from other users of the message system. For example, a message system can provide users with the ability to communicate with other users by sending and receiving real-time, or near real-time electronic messages (e.g., an instant messaging platform). In addition to providing a communication platform, the message system can provide a payment platform that allows a user to define a payment to be made to another user, and initiate a payment transaction or otherwise send the defined payment to the other user.

One or more example embodiments of a transactional payment system can provide numerous benefits and advantages compared to conventional payment applications. For example, a transactional payment system can reduce or eliminate the need for a sender to fill out multiple payment fields to request a payment to be sent to a recipient. For example, users of a message system already have user accounts established with the message system, and therefore, a message system can greatly increase the ease and speed by which users can send payments to each other. Specifically, the particular other users to whom a user would desire to send a payment are also the same particular other users (e.g., friends, family, colleagues, etc.) that a user likely already has an established connection within a messaging system.

Furthermore, one or more embodiments of the transactional payment system provide an intuitive user experience that allows users to easily and confidently send payments to one another. For example, a sender can send a payment to a recipient from within a familiar and intuitive graphical interface also used to send electronic messages. In addition, the transactional payment system can provide interactive status messages to allow both the sending and the receiving users to interact with and monitor a payment process within a message thread of a messaging application. Thus, one or more embodiments of a transactional payment system allow users to initiate, monitor, and complete a payment transaction within a user-friendly user environment of a messaging application.

Furthermore, example embodiments of a transactional payment system described herein eliminate the need for card readers, thereby minimizing the threat of compromising sensitive credit or debit card information. Additionally, one or more embodiments of a transactional payment system can intelligently and dynamically use centrally maintained payment method information in processing payments (e.g., stored on a server device as opposed to a client device). The increased security and reliability provided by the transactional payment system can, therefore, increase user confidence based on the fact that a client device does not need to maintain or send a user's sensitive information to process a payment.

Additionally, one or more embodiments of a transactional payment system may allow users to send and receive payments without employing a separate or standalone application. In this way, users of the system need not purchase, download and/or learn another application for sending and receiving payments. The result is a larger and quicker adoption rate of sending payments via a transactional payment system, which in turn creates a large network of users available to send and receive payments using a single platform.

As used herein, the term "message" or "messages" refers to any form of electronic communication between two or more computing devices. In one or more embodiments, a message is an instant message communicated via an instant message communication system. In alternative embodiments, however, a message can refer to any from of electronic communication, such as an SMS message, an email, or a social network post or comment.

In addition, the term "payment message" refers to a message that indicates payment information that allows a user to send a payment to one or more other users. For example, a payment message can include a data package that includes a payment amount, sender, recipient, payment method, as well as additional information. Furthermore, the term "payment," as used herein, refers to a monetary transfer from one or more sender users to one or more recipient users. For example, a payment can represent a monetary gift, a payment of a debt, a funding of a loan, a payment in consideration for a purchase of goods and/or services, or any other type of monetary transfer. In addition, a payment can be made in one or more currencies and converted, based on an exchange rate for example, to one or more additional currencies.

As used herein, the term "account" refers to a financial account into and out of which liquid cash assets can be transferred. For example, an account may refer to a user's bank account, debit card account, cash card, credit card account, online accounts (e.g., a messaging account), gift card account, or any other account from which money can be deducted, and to which money can be credited/deposited. The meanings of the above terms, as well as additional terms, will become more apparent in light of the disclosure below.

FIG. 1 illustrates a schematic diagram of an example payment transaction system 100 (hereafter "system 100") in accordance with one or more embodiments. As shown in FIG. 1, a user 102a, a user 102b, and up to any number of users 102n (collectively "users 102") can use the system 100. Furthermore, the system 100 can include a corresponding number of client devices 104a, 104b, and up to any number of client devices 104n (collectively "client devices 104"). As further illustrated in FIG. 1, the client devices 104 can communicate with one or more server device(s) 110 (or simply "server device 110") via a network 105. In addition, the system 100 can include a payment network 115 communicatively coupled with the network 105. Although FIG. 1 illustrates a particular arrangement of the computing devices 104, the network 105, the server device 110, and the payment network 115, various additional arrangements are possible. For example, the computing devices 104 may directly communicate with the server device 110, bypassing network 105.

As briefly mentioned above, FIG. 1 shows that user 102a and user 102b can use client devices 104a and 104b, respectively, to communicate with one another via the server device 110. For example, user 102a and user 102b can exchange electronic messages including text, digital content (e.g., audio, images, video), location information, and other forms of information. For instance, the user 102a can compose a message intended for the user 102b on client device 104a. After composing the message, the user 102a can cause the client device 104a to send the message intended for the user 102b via the network 105 to the server device 110. The server device 110 can identify the user 102b as the intended recipient, and forward the message to the client device 104b associated with the user 102b.

In addition to allowing the users 102 to exchange messages, the system 100 can allow the users 102 to send and receive payments to and from one another. As will be discussed in detail below, the system 100 allows users 102 to send a payment message that includes payment information to facilitate a payment to another user. For instance, the user 102a can send a payment to user 102b via the server device 110. Likewise, user 102b can receive notice of the payment, and accept or decline the payment, via the server device 110. As will be explained in more detail below, the server device 110 can communicate with the payment network 115 to coordinate a transaction that processes the payment (e.g., withdraws money from a sender account and deposits money into a recipient account).

While the system 100 can facilitate a payment between the two users 102a and 102b, the system 100 can also facilitate a payment between more than two users. For example, the user 102a may send a payment to users 102b through user 102n, which includes any number of additional users. In one or more embodiments, the user 102a can send payments to multiple users 102 within the same payment transaction by defining and sending a single payment message addressed to multiple users, as will be discussed in further detail below. Furthermore, in one or more embodiments, a group of users may send or receive payments through the system 100, either to or from other groups or individual users.

While FIG. 1 illustrates the users 102 as human users, the users 102 may include a business, government agency, or other types of entities. For example, the user 102a can use the system 100 to provide a payment to a business for services or products. For instance, the user 102a can communicate with a business by sending messages to a client device associated with the business via the server device 110. The user 102a can ultimately decide to make a purchase of goods or services from the business. The user 102b can then send a payment for the goods or services to the business via the server device 110. Similarly, a business may send payments to other businesses or individuals.

As mentioned above, and as FIG. 1 illustrates, the users 102a and 102b can interact with the client devices 104a and 104b, respectively, to communicate with one another via the server device 110. Examples of client devices 104 include, but are not limited to, mobile devices (e.g., smartphones, tablets), laptops, desktops, or any other type of computing device. See FIG. 10 for additional information regarding example embodiments of client devices 104. Moreover, and as mentioned above, the client devices 104 can send and receive electronic communication via the network 105. In one or more embodiments, the network 105 includes the Internet or World Wide Web. The network 105 can also include one or more private and/or public networks that use various communication technologies and protocols, as further described below with reference to FIG. 11.

In addition to facilitating the exchange of messages between the client devices 104 associated with the users 102, the server device 110 can coordinate the sending and receiving of payments between the users 102. For example, the user 102a can define and send a payment via the server device 110 to the user 102b. For instance, the user 102a can provide input to the client device 104a to define a payment method (e.g., an account of the sender user 102a), a payment amount, a currency, a payment description, and/or various other payment details.

From the user's 102a perspective, for example, the sender user 102a can define and send a payment via the server device 110 in a similar manner as sending a communication message (e.g., instant message) through the server device 110. For example, in one or more embodiments, the user 102a can define a payment by providing payment information. After defining a payment, the sender user 102a can cause the client device 104a to send a payment message to the server device 110. Upon receipt of a payment message, the server device 110 can coordinate a transaction that allows a payment to be made from a sender user's 102*a* account to a recipient user's 102*b* account.

In one or more embodiments, the server device 110 can coordinate a transaction between one or more accounts of the sender user 102*a* and one or more accounts of the recipient user 102*b* via the payment network. For example, in response to receiving a payment message from the sender user 102*a*, the server device 110 can communicate payment information to facilitate a payment using one or more components within the payment network 115. Alternatively, or additionally, the server device 110 can maintain one or more user 102 accounts within the server device 110, and therefore, the server device 110 can coordinate a transaction, or a portion of a transaction, directly on the server device 110 with respect to accounts maintained within the server device 110.

As illustrated in FIG. 1, the payment network 115 can include a payment gateway system 118, a payment processing system 120, a card network system 122 and an issuing bank system 124. In alternative embodiments, however, the payment network 115 can include more or fewer components depending on a particular embodiment of system 100. One or more computing devices can execute and/or implement the components of the payment network 115.

In one or more embodiments, for example, the server device 110 can communicate with the payment network 115 to authorize and process a transaction. For example, the server device 110 can send a transaction to the payment gateway system 118, as shown in FIG. 1. Once the payment gateway system 118 receives the transaction, the payment gateway system 118 can send the transaction to the processor (e.g., payment processing system 120) used by a recipient user's 102 acquiring bank. Based on the method of the payment (e.g., sender user's 102 account), the payment processing system 120 can transmit the transaction to an appropriate card network system 122. In many instances, the card network system 122 then sends the transaction to an issuing bank system 124.

The issuing bank system 124 either approves or declines the transaction, and sends the decision back to the card network system 122. The card network 122 then sends the decision to the payment processing system 120. The payment processing system 120 can then forward the decision to the payment gateway system 118, and in one or more embodiments, the payment gateway system 118 can maintain the details related to the transaction and the decision. The payment processing system 120 also sends the decision to the server device 110.

In addition to authorizing a transaction, the payment network 115 can also perform settlement tasks. For example, the server device 110 can coordinate with the payment gateway system 118 to submit a daily settlement batch including one or more captured transactions to an acquiring bank via the acquiring bank's preferred payment processing system 120. The payment processing system 120 then sends the settlement batch to a server of the acquiring bank (not illustrated), which records a deposit in the amount of each transaction within the settlement batch to an account associated with a payment recipient user.

The acquiring bank can then send a funding request in satisfaction of the deposit amount to the payment processing system 120, which passes the funding request to the appropriate card network system 122. The card network system 122 then sends the funding request to the issuing bank system 124. The issuing bank system 124 can post the transaction to the sender user's account and pass a release of the funds to the card network system 122, which are then passed to the payment processing system 120, and then the acquiring bank. Additional details relating to the specific systems, methods, components and process of system 100 are described below.

Figure 2:
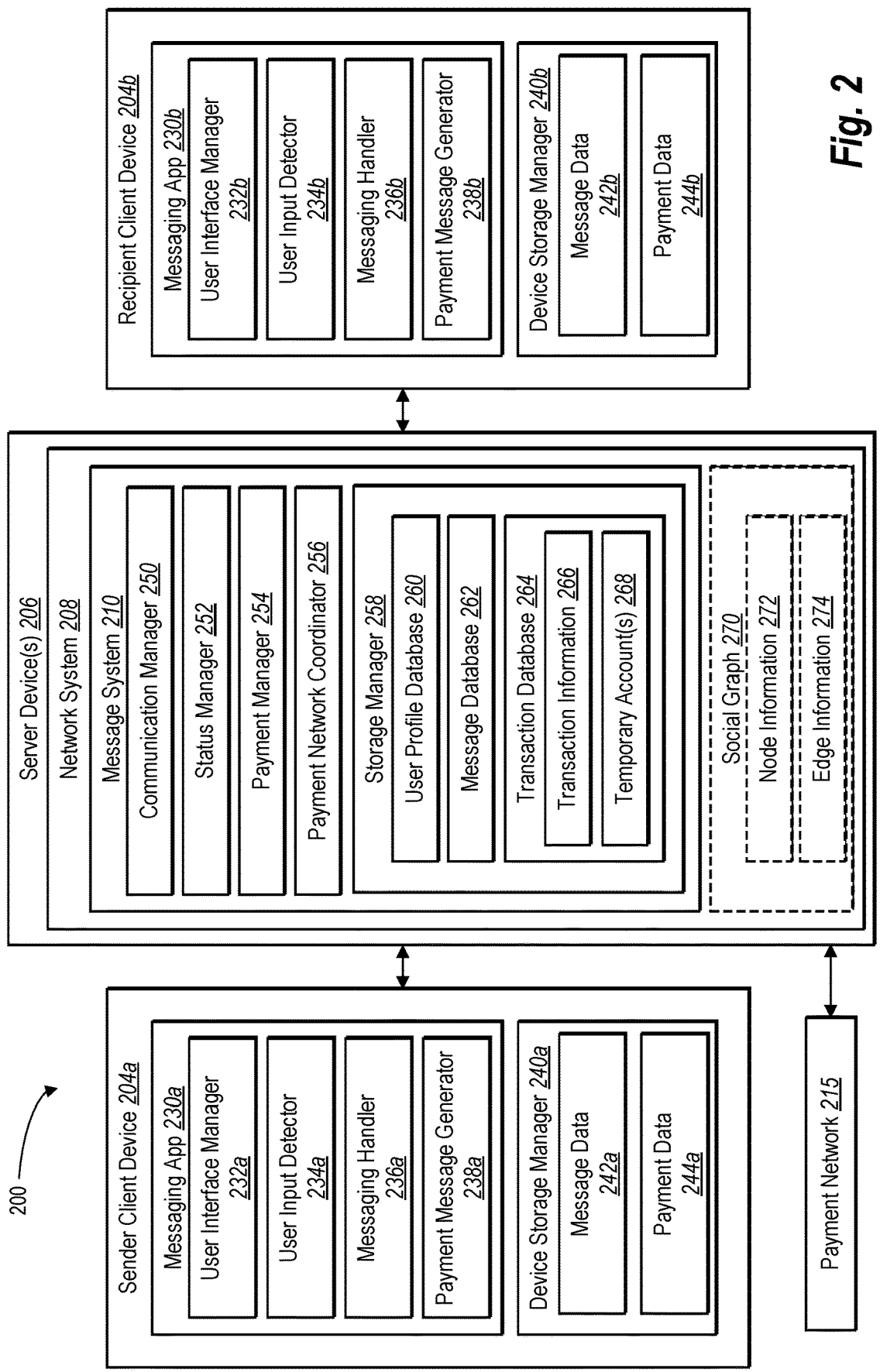
FIG. 2 illustrates a schematic diagram of an example system that facilitates the sending of payments between two users f a message system in accordance with one or more embodiments.

FIG. 2 illustrates a schematic diagram of an example embodiment of a payment transaction system 200 (hereafter, "system 200") in accordance with one or more embodiments described herein. For example, the system 200 can represent one or more embodiments of the system 100 discussed above with respect to FIG. 1, and as such, system 200 can include one or more components, functions, and/or characteristics as discussed above with respect to system 100. In one or more embodiments, as shown in FIG. 2, the system 200 can include a sender client device 204*a*, a recipient client device 204*b*, one or more server device(s) 206 (or simply "server device 206"), and a payment network 215. In general, the system 200 can allow a user of the sender client device 204*a* to send a payment via the server device 206 to a user of the recipient client device 204*b*.

As further illustrated in FIG. 2, in one or more embodiments the server device 206 can provide a network system 208. For instance, the network system 208 can be any of one or more services that provide, in whole or in part, communication capabilities between two or more users. In one or more embodiments, for example, the network system 208 is a social-networking system (e.g., Facebook™). Alternatively, the network system 208 can be another type of communication system, communication network, communication service, or any other type of system that uses user accounts.

As further illustrated in FIG. 2, in the case of the network system 208 being a social-networking system, the network system 208 may include a social graph 270 for representing and analyzing a plurality of users and concepts. As shown in FIG. 2, the social graph 270 can include node information 272 that stores information comprising nodes for users, nodes for concepts, and nodes for items. In addition, the social graph 270 can include edge information 274 comprising relationships between nodes and/or actions occurring within the social-networking system. Further detail regarding social-networking systems, social graphs, edges, and nodes is presented below with respect to FIG. 11.

As shown in FIG. 2, the network system 208 can further include a message system 210. For instance, the message system 210 can manage, coordinate, and facilitate the sending and receiving of messages between users via the server device 206. Additionally, the message system 210 can manage, coordinate, and facilitate the sending and receiving of payments between users via the server device 206. In one or more embodiments, the server device 206 simply can include the message system 210 as a standalone system (e.g., the message system 210 is not part of a broader network system). Additional components and features of the message system 210 will be discussed below.

As illustrated in FIG. 2, the sender client device 204*a* and the recipient client device 204*b* each can include various components. In one or more embodiments, the sender client device 204*a* and the recipient client device 204*a* have similar components, which alone or in combination, perform one or more functions with respect to sending and receiving messages, as well as sending and receiving payments. Although FIG. 2 differentiates between the components of the sender client device 204*a* and the recipient client device 204*b*, the components for each client device 204 are substantially the same and perform one or more methods, processes, or functions based on whether a client device is associated with the sender of a payment, or whether a client device is associated with the recipient of a payment. Thus, although reference may be made to a characteristic of a component of the sender client device 204a, it should be understood that the corresponding component of the recipient client device 204b also includes the referenced characteristic, and visa versa.

As shown in FIG. 2, the sender client device 204a can include a messaging application 230a having a user interface manager 232a, a user input detector 234a, a messaging handler 236a, and a payment message generator 238a. In addition, the sender client device 204a can include a device storage manager 240a that maintains message data 242a and payment data 244a. Each of the components 230a-244a of the sender client device 204a may be in communication with one another using any suitable communication technologies. It will be recognized that although components 230a-244a are shown to be separate in FIG. 2, any of components 230a-244a may be combined into fewer components, such as into a single facility or module, or divided into more components as may serve a particular embodiment.

The components 230a-244a can comprise software, hardware, or both. For example, the components 230a-244a can comprise computer instructions stored on a non-transitory computer-readable storage medium and executable by at least one processor of the sender client device 204a. When executed by the at least one processor, the computer-executable instructions can cause the sender client device 204a to perform the methods and processes described herein. Alternatively, the components 230a-244a can comprise hardware, such as a special purpose processing device to perform a certain function or group of functions.

In one or more embodiments, the messaging application 230a can be a native application installed on the sender client device 204a. For example, messaging application 230a may be a mobile application that installs and runs on a mobile device, such as a smart phone or a tablet. Alternatively, the messaging application 230a can be a desktop application, widget, or other form of a native computer program.

Moreover, the messaging application 230a may be a remote application that the sender client device 204a remotely accesses. For example, the messaging application 230a may be a web application that runs within a web browser of the sender client device 204a. For example, user 102a may use a native messaging application installed on the client device 104a to send a payment via the server device 110 to user 102b who may use a web application that the user 102b accesses with a web browser installed on the client device 104b.

As mentioned above, and as shown in FIG. 2, the messaging application 230a can include a user interface manager 232a. The user interface manager 232a can provide, manage, and/or control a graphical user interface (or simply "user interface") that allows a user to compose and send messages, including payment messages, using the messaging application 230a. In addition, the user interface manger 232a allows a user to view messages that other users send to the user. For example, the user interface manager 232a can provide a user interface that facilitates the composition of a message, such as an instant message. Likewise, the user interface manager 232a can provide a user interface that displays messages received from other users.

More specifically, the user interface manager 232a may facilitate the display of a user interface (e.g., by way of a display screen associated with the client device 204a). For example, the user interface may be composed of a plurality of graphical components, objects, and/or elements that allow a user to compose, send, and receive messages. More particularly, the user interface manager 232a may cause the sender client device 204a to display a group of graphical components, objects and/or elements that enable a user to view a message thread (see FIG. 5A), wherein the message thread includes a plurality of messages sent to, and received from, one or more other users.

In addition, the user interface manager 232a may cause the client device 204a to display one or more graphical objects or elements that facilitate user input for composing and sending a message. To illustrate, the user interface manager 232a may provide a user interface that allows a user to provide user input to the messaging application 230a. For example the user interface manager 232a can provide one or more user interfaces that allow a user to input one or more types of content into a message. As used herein, "content" refers to any data or information to be included as part of a message. For example, the term "content" will be used herein to generally describe, text, images, digital media, files, location information, payment information and any other data that can be included as part of a message.

As discussed above, one example of content that can be included in a message is payment information (e.g., a payment message). In one or more embodiments, the user interface manager 232a can provide a user interface to allow a user to easily and efficiently define and send payment information that defines a payment to be made to one or more other users. For example, the user interface manager 232a can provide one or more input fields and/or one or more user selectable elements with which a user can interact to create and send a payment message.

For example, in one or more embodiments, the user interface manager 232a can provide a user interface that includes a recipient input field that allows a user to select or otherwise input one or more recipient users to receive a payment. In addition the user interface manager 232a can provide a payment input field that allows the sender user to define a payment amount to send to the recipient user(s). Moreover, the user interface manager 232a can provide a payment method element and authorization code input field that allows a user to select a payment method and provide authorization for a payment (e.g., a PIN or password). The user interface manager 232a can provide a user interface that includes additional features and characteristics to allow a user to create and send a payment message to one or more users, as will be discussed further below with reference to FIG. 5B.

User interface manager 232a can further facilitate a presentation of one or more payment status messages within a message thread of a user interface. For instance, in response to a user defining a payment and sending a payment message, the message system 210 can send a payment status message for display within a message thread in the user interface on both the sender client device 204a and the recipient client device 204b. A payment status message can present payment information, status of the payment (e.g., status of a payment process) as well as provide one or more selectable actions that relate to the payment (e.g., a cancelation option).

In addition to presenting a payment status message, the user interface manager 232a can receive instructions or communications from one or more components of the messaging application 230a to display updated payment information, updated status of the payment, and/or updated available actions within the payment status message. For example, the user interface manager 232a can update the status of the payment from "Sending Payment" to "Payment Complete."

In addition, the user interface manager 232a can update available selectable options within a payment status message based on whether a particular option is available at a particular phase of a payment process. For example, in one or more embodiments, prior to a recipient accepting a payment, the user interface manager 232a can cause the sender client device 204a to provide a selectable "Cancel Payment" option within the sender status message. After the recipient user accepts the payment, however, the user interface manager 232a can receive an instruction or communication that indicates the recipient user's acceptance, and in response, the user interface manager 232a can remove the "Cancel Payment" option from within the sender status message. The user interface manager 232a can add, remove, and/or update various other selectable options within a sender status message and/or a receiver status message, as will be discussed further below with reference to FIGS. 3A-4B.

As further illustrated in FIG. 2, the messaging application 230a can include a user input detector 234a. In one or more embodiments, the user input detector 234a can detect, receive, and/or facilitate user input in any suitable manner. In some examples, the user input detector 234a may be configured to detect one or more user interactions with respect to a user interface. As referred to herein, a "user interaction" means a single interaction, or combination of interactions, received from a user by way of one or more input devices.

For example, the user input detector 234 may detect a user interaction from a keyboard, mouse, touch pad, touch screen, and/or any other input device. In the event the sender client device 204a includes a touch screen, the user input detector 234a may be configured to detect one or more touch gestures (e.g., swipe gestures, tap gestures, pinch gestures, or reverse pinch gestures) from a user that forms a user interaction. In some examples, a user can provide touch gestures in relation to and/or directed at one or more graphical objects or graphical elements of a user interface.

The user input detector 234 may additionally, or alternatively, receive data representative of a user interaction. For example, user input detector 234 may receive one or more user configurable parameters from a user, one or more user commands from the user, and/or any other suitable input. In addition, the user input detector 234 may receive input data from one or more components of the messaging application 230a, from storage on the sender client device 204a (e.g., device storage manager 240a), or from one or more remote locations (e.g., server device(s) 206).

The messaging application 230a can perform one or more functions in response to the user input detector 234a detecting user input and/or receiving other input data. Generally, a user can control, navigate within, and otherwise use the messaging application 230a by providing one or more user inputs that the user input detector 234a can detect. For example, in response to the user input detector 234a detecting user input, one or more components of the messaging application 230a allow a user to select a recipient for a message, compose a message, select content to include in a message, and/or send a message to the recipient. Additionally, in response to the user input detector 234a detecting user input, one or more components of the messaging application 230a allow a user to navigate through one or more user interfaces to review received messages, contacts, etc.

In one or more embodiments, in response to a user input detector 234a detecting one or more user inputs, the messaging application 230a can allow the user to define a payment and cause the messaging application to create and send payment message that facilitates a payment to one or more other users. For example, a user needing to send a payment to another user can interact with a payment element provided on a menu within a user interface (see FIG. 5A). Upon detecting the user interaction with the payment element, the user input detector 234a can coordinate with the user interface manager 232a to provide one or more user interface elements with which the user can interact to create a payment message. Therefore, in response to the input detector 234 detecting one or more user inputs, the messaging application 230a can allow a user to create a customized payment message that defines a payment to be sent to another user.

As further illustrated in FIG. 2, the messaging application 230a can include a messaging handler 236a. Generally, the messaging handler 236a manages message communication for the messaging application 230a. More particularly, the messaging handler 236a can coordinate with one or more components of the messaging application 230a to facilitate the sending and receiving of messages. For example, the messaging handler 236a can interact with the user interface manager 232a and the user input detector 234a to coordinate formatting and packaging input data, as well as other content, in a message to send via the message system 210.

Moreover, the messaging handler 236a can send messages via one or more communication channels using an appropriate communication protocol. Likewise, the messaging handler 236a can receive and process messages the client device 204a receives from other users via the message system 210.

In addition to providing communication functions within the messaging application 230a, the messaging handler 236a can provide access to message data (e.g., message data 242a) used by the messaging application. For example, the messaging handler 236a can access data that represents a list of contacts, or one or more groups of contacts, to include as recipients to a message. To illustrate, the messaging handler 236a can obtain and provide data representing a contact list to the user interface manager 232a to allow the user to search and browse a contact list, and ultimately select an individual contact, multiple contacts, or group of contacts to include as recipients of a message. In one or more embodiments, the network system 208 (e.g., a social networking system) can maintain remote contact list data (e.g., a "friends list"), and the messaging handler 236a can access, or request to receive, the contact list data from the network system 208 for use within the messaging application 230a.

The messaging handler 236a can also provide access to other local or remote data that the messaging application 230a can use to compose, send, and receive messages. For instance, the messaging handler 236a can obtain access to files, images, audio, video and other content that a user can include in a message. Moreover, the messaging handler 236a can provide access to one or more functions of the sender client device 204a to provide the user the ability to capture or create content to include within a message. For example, the messaging handler 236a can activate a camera, a microphone, or other function that allows the user to capture content to include in a message.

In addition to sending messages with the above-identified content, the messaging handler 236a can also facilitate the sending of a payment message. In particular, FIG. 2 illustrates that the messaging application 230a can include a payment message generator 238a that can generate a payment message. In one or more embodiments, the payment message generator 238a can provide a payment message to the messaging handler 236a, and the messaging handler 236a can send the payment message to the message system 210 to initiate a payment process from a sender to a recipient.

For example, the payment message generator 238a can create a data package that includes payment information a sender input into the messaging application 230a. In particular, the user interface manager 232a can provide one or more user interfaces to facilitate the input and/or selection of various types of payment information to include in a payment message.

One type of payment information that the payment message generator 238a can include in a payment message is a recipient of a payment. For example, as illustrated in FIG. 2, the sender associated with the sender client device 204a may specify the recipient associated with the recipient client device 204b as the recipient of a payment. Additionally, in some example embodiments, the payment message generator 238a allows the sender to specify multiple recipients. For instance, the user interface manager 232a can provide a contact list of users from which the sender can select one or more recipients.

Similar to the sender specifying multiple individual users, in one or more embodiments, the sender may setup or define payment groups that include multiple users, and/or multiple groups of users. For instance, just as a user may have a need to send a message to multiple users at the same time, a user may also have a need to send a payment to multiple users. For example, the sender may define a payment group based on a particular need to pay a group of people in a quick and efficient manner (e.g., sending a single payment message with multiple recipients). As with other contact lists, the device storage manager 240a can maintain the payment group definitions for access by the payment message generator 238a based on, for example, the user input detector 234a detecting the sender selecting one or more payment groups.

The messaging application 230a can allow a user to create a payment group using one or more techniques. For example, and as indicated above, a payment group can be a pre-defined group of recipients. Alternatively, or additionally, a sender can create a payment group on the fly within the messaging application 230a by adding multiple recipients to a messaging session. For instance, in the event a sender desires to send a payment to a first recipient and second recipient, the sender can initiate a messaging session with the first recipient, and then add the second recipient to the messaging session, thereby creating a payment group on the fly within the messaging application 230a. The sender can then create a payment message to send a group payment to the payment group that includes both the first recipient and the second recipient.

In a similar manner, a sender can select a pre-defined payment group within the messaging application 230a. Prior to creating a payment message, however, the sender can further add one or more additional individual recipients and/or one or more additional payment groups to the messaging session. Upon a sender adding the additional recipients to the messaging session, the pre-defined payment group is modified on the fly to include the additional recipients. In one or more embodiments, the messaging application 230a can present the sender with the option of saving the modifications to the payment group (e.g., the payment group would continue to include the additional recipients), or alternatively, the messaging application 230a can remove the additional users from the pre-defined payment group at a point in time after the payment message is sent (e.g., when a sender closes the messaging session associated with the group payment).

In the event the sender identifies multiple recipients and/or identifies a payment group, the sender can define a payment amount for each individual recipient to allow the payment message generator 238a to associate a payment amount with each individual recipient for inclusion within the payment message. For instance, the sender may specify that each individual recipient within a particular payment group receive the same payment amount (e.g., each user within a payment group receives $30.00 from the sender). In particular, the user interface manager 232a can present a uniform payment amount selectable element with which the sender can interact to define a uniform payment amount across multiple users defined in a single payment message.

Alternatively, the sender may specify a different payment amount for each individual recipient. For example, the user interface manager 232a can provide a user interface that includes a payment amount field corresponding to each individual recipient within a payment group. The user input detector 234a then detects sender input to define individualized payment amounts within the payment amount field that corresponds to each individual recipient. Accordingly, when the message system 210 processes the payment message (as will be discussed further below), each recipient included within the payment message will receive an individualized payment amount.

In one or more additional embodiments, the sender may also specify a group payment amount. In other words, the sender can specify a single payment amount that is generically allocated to the payment group. A group payment amount, for example, provides an efficient and user-friendly experience for a user wanting or needing to send a payment to a group of recipients.

For instance, a sender may select a payment group that includes five recipients, and then compose and send a payment message that includes a group payment amount of $100. In one or more embodiments, a sender can specify the payment distribution ratio for each recipient within the payment group via a user interface, user preferences, or other settings. For example, as part of a process for defining a payment, the user interface manager 232a can provide a selectable option to a sender to specify an equal distribution ratio among all the recipients within the group.

Specifically, with reference to the example provided in the preceding paragraph, the payment message generator 238a can allocate the $100 group payment into five equal recipient payment amounts (e.g., $20 for each of the five recipients). In addition, the payment message generator 238a can associate the recipient payment amounts with each of the corresponding recipients, and generate payment information to include in a payment message for purposes communicating the payment information to the message system 210.

Furthermore, instead of a sender defining a payment distribution ratio for a group of recipients, one or more recipients within the payment group may define a payment ratio for purposes of distributing a group payment amount to the recipients within the group. For example, the payment group can define a payment distribution ratio that applies to all payments made to the group. Alternatively, the payment group can specify various payment distribution ratios that are triggered based on one or more factors, for example, the identity of the sender, the type of payment, a time period the payment was received, and various other factors based on data or information within the system 200.

Moreover, the payment message generator 238a can customize the payment distribution ratio for a particular purpose. In some embodiments, one or more recipients within a payment group may have a payment distribution ratio of zero. Moreover, a recipient within a payment group may have a payment distribution ratio of 1 (e.g., 100% of the group payment is allocated to the sole recipient). Having one or more recipients within a payment group that are associated with a zero value payment distribution ratio can have advantages.

To illustrate, a business may strategically include employees in a payment group and assign the employees a payment distribution ratio of zero. For example, the business can create a payment group that includes the business entity, and one or more employees of the business. Because the business is receiving a payment in exchange for a product (e.g., goods and/or services), the business has a payment distribution ratio of 1. On the other hand, the business likely does not want employees to have access to monetary payments. Based on the employee's job responsibilities, however, the employee may need access to the payment information and/or status messages associated with a payment message. Therefore, the business can assign the employees a payment distribution ratio of zero.

In order to make a payment to the business, a customer can select a payment group associated with the business. The customer can then define a payment, and send a payment message to the message system 210. Upon receiving the payment message, the message system 210 initiates a transaction process to transfer the payment into an account (e.g., a bank account) for the business. In addition, due to the employees' association with the payment group, as well as being assigned a payment distribution ratio of zero, the employees can receive payment status messages on a client device with respect to the payment to the business. The employees, however, never have access at any point to the payment funds that are paid directly into the business account.

Another illustrative example of sending a multiple recipient payment message can include a sender using the messaging application 230a on the sender client device 204a to send a payment to a restaurant for a meal, and within the same payment message, send a payment (e.g., a tip) to the waiter. For instance, the restaurant and the waiter can be part of a payment group, with each of the restaurant and the waiter associated with a separate recipient client device.

When defining the payment, the sender can select the payment group that includes both the restaurant and the waiter. In addition, the sender can define the payment amount to be paid to the restaurant as well as the waiter. For example, the sender can define a payment amount to send to the restaurant in the amount of the restaurant bill, and in addition, the sender can define a payment amount to send to the waiter in the amount of a tip. In one or more embodiments, the user interface manager 232a can provide a selectable percentage option that automatically determines the payment amount to send to the waiter based on the user selecting a particular percentage value to apply to the payment amount of the restaurant bill (e.g., a 20% tip).

After the sender has defined the payment amounts for both of the restaurant and the waiter, the sender can choose to send the payment message. As discussed above in detail, the payment message generator 238a can generate a single payment message that includes payment information for both the restaurant and the waiter. The message system 210 can then process the payment message, which ultimately results in a payment depositing into a restaurant account and a payment depositing into the waiter's account.

In addition to a sender sending a payment to multiple recipients, a recipient can request a payment from multiple senders. For example, using or more of the techniques described herein with respect to a creating a payment message, a recipient can specify one more senders from which to request a payment. As is the case when a sender creates a payment message to send to a payment group, a recipient can also create a payment message that requests a payment from a pre-defined set of senders and/or the recipient can create a payment group on the fly by adding multiple senders to a messaging session.

Therefore, due to the fact that the payment message generator 238a facilitates multiple recipient payments, as well as individualized payment amounts, the system 200 provides an efficient and user-friendly payment mechanism, while at the same time the system 200 also provides a payment mechanism that can perform a wide range of financial transactions.

In addition to facilitating multiple recipient payments, one or more embodiments can include multiple sender payments. For example, as part of a process of defining a payment, a sender may also define another sender to contribute to the payment amount. The message system 210 can execute a payment verification process with the other sender to verify that in fact the other sender does wish to contribute to the payment, as well as to allow the other sender to define a method of payment. For example, the messaging system can send the other sender a payment status message (discussed in more detail below) that includes selectable options to verify participation, select a payment method, provide an authorization code, and provide other information.

Upon the additional sender providing the requested information, the additional sender can interact with the status message to cause the payment message generator 238 to send an additional payment message to the message system 210. The message system can then combine the payment information from the first sender with the payment information from the second sender, and process the payment accordingly such that the recipient receives payments from each of the two senders. The multiple sender capability of the system 200 provides an efficient payment mechanism that allows two senders to pay a recipient in a combined payment process. The multiple sender payment capability provides a more efficient and intuitive payment system than conventional payment systems where one sender had to pay the total payment amount to the recipient, and then the second sender would have to initiate another payment transaction to repay the first sender for the second sender's portion.

In addition to defining the sender(s) and/or recipient(s) to include in a payment message, the sender can provide additional input that the payment message generator 238a uses to generate the payment information to include in a payment message. As briefly mentioned above, the sender can select or input a payment method as part of the process of defining a payment. In one or more embodiments, the sender may have previously registered one or more payment methods with the message system 210. For example, the sender may have registered a bank debit card as well as a credit card. Other examples of payment methods include gift cards, an online account associated with the message system 210, as well as other accounts that allow for electronic transfers into and out of the account.

The device storage manager 240a can maintain data representing the registered payment methods within payment data 244a on the sender client device 204a. The user interface manager 232a can access the data representing the registered payment methods and present the registered payment methods as selectable options within a user interface. In one or more embodiments, the user must register payment method prior to sending a payment. In the event that the sender has not registered a payment method, the user interface manager 232a can provide a selectable option to allow the sender to initiate the process of registering a payment method.

Alternatively, in one or more embodiments, the system can allow a sender to provide a payment method on a payment-by-payment basis (e.g., no payment registration process is used). In one or more embodiments, the user interface manager 232a can provide a payment method field that allows a user to define a payment method. For example, the payment method field can prompt the user to provide a payment type, account number, authorization code, expiration date, billing address information, and other information to define a payment method.

In addition to one or more payment methods, the payment message generator 238a can incorporate additional payment information in a payment message. For example, the user interface manager 232a can allow a user to select or otherwise define a payment currency. In particular, the system 200 can allow a sender using the sender client device 204a in the United States to send a payment in Euros to a recipient using the recipient client device 204b in Paris.

Another way in which a sender can define a payment is to define a payment schedule. For example, the messaging application 230a can allow a user to setup regularly scheduled payments to one or more recipients. For example, a sender may want to send a defined payment amount to a recipient once a quarter, once a month, once a week, or another regular schedule. Furthermore, the sender may want to send a defined payment amount to a recipient on a particular date every year. For example, the sender may want to send a payment amount in the form of a birthday gift on a recipient's birthday.

Upon a user defining a payment schedule, the payment message generator 238a can generate a payment message. Instead of providing the payment message to the messaging handler 236a to send to the message system 210, however, the payment message generator 238a can cause the device storage manager 240a to maintain the payment message until the scheduled time. Upon the tolling of the scheduled time, the message handler 236a can automatically send the scheduled payment message to the message system 210 to initiate the payment process to the recipient. Alternatively, the messaging handler 236a can coordinate with the user interface manager 232a to provide a notification (e.g., a popup window) that requests confirmation that the sender wishes to send the scheduled payment amount to the recipient.

In one or more embodiments, the notification of the scheduled payment is provided as a message bubble within a message thread. For instance, the message handler 236a can cause the user interface manager 232a to create a new message thread that includes the notification of the scheduled payment. The message bubble may also include one or more selectable options that allow the sender to confirm the scheduled payment or cancel the scheduled payment. Upon confirming the scheduled payment, the message handler 236a sends the scheduled payment message to the message system 210 for processing the payment.

In addition to defining a payment schedule, a sender can further define a payment to a recipient by providing a customized message. In particular, due to the system 200 employing a message system 210 to facilitate payments between users, a sender can easily input a customized message to a recipient. In particular, and as will be shown in detail with respect to FIGS. 5A-7C, the user interface manager 232a presents payment status messages in the same form as user messages (e.g., content bubbles). Therefore, including a message within a payment status message adds to the uniformity and enjoyment of the user experience. In addition, the customized message allows the sender to explain the payment to the recipient, again adding to the intuitive nature of sending and receiving payments using the system 200.

In addition to the above types of payment information, in general, a payment message can include the payment amount, one or more sender identifiers, one or more recipient identifiers, one or more payment methods, authorization information, currency information, a message or payment description, and/or any other data that may be helpful to facilitating a payment form the sender to the recipient. The payment message generator 238a can pass the payment message to the messaging handler 236a to send the payment message to the message system 210.

In one or more embodiments, the payment message generator 238a can use default payment information associated with the sender. For example, the messaging application 230a can allow a sender to input and save one or more payment profiles that are associated with predefined payment information. A payment profile can allow a sender to define and send a payment with increased ease and efficiency.

In one or more embodiments, a messaging application 230a can allow a sender to send a payment to a recipient with minimal user interaction when using a default payment method or predefined payment profile. For example, the user input detector 234a can detect that the sender provides a user interaction with respect to a payment element within a user interface. In response, the user interface manager 232a can provide a user interface that is prepopulated with the default payment information, including a payment amount (e.g., the payment amount may be based on a past payment amount sent to the same recipient) and authorization information.

Upon the sender visually confirming the payment information, the sender provides a user interaction with respect to a selectable send option, and the payment message generator 238a generates the payment message that the message handler 236a then sends to the message system 210. Therefore, from within the messaging application 230a, the sender can send a payment to a recipient in as few as two user interactions. In one or more alternative embodiments, the sender can predefine a payment profile that includes all of the necessary payment information. In such an embodiment, the sender need only provide a single user interaction of selecting a payment element within a user interface to cause the payment message generator 238a to generate a payment message, and the messaging handler 236a to send the payment message to the message system 210.

In one or more embodiments, the payment message generator 238a can access and provide a token within a payment message. For example, upon the sender providing an authorization password, the payment message generator can generate a token to include in the payment message that verifies the sender and/or sender client device 204a is authorized to make the payment. For example, the token can include identifying information that indicates previous payments from the sender using the same payment method were successful. Other identifying information regarding the sender, the sender client device 204a, and/or the sender's payment history can be indicated with the token to increase the security of payment messages.

As referenced in the above discussion, the sender client device 204a can include a device storage manager 240a, as illustrated in FIG. 2. Device storage manager 240a can maintain message data 242a representative of data used in connection with composing, sending, and receiving messages between a user and one or more other users. For example, message data 242a can include message logs, contact lists, content, past communications, and other similar types of data that the messaging application 230a can use in connection with providing the ability for users to communicate using the messaging application 230a.

Device storage manager 240a may also maintain payment data 244a representative of information used to generate payment messages. For example, payment data 244a may include payment method data, sender account data (e.g., bank or credit card account data), passwords, PINs, authorization codes, and security tokens. Furthermore, payment data 244a can include payment preferences (e.g., a default payment method or payment profile). In general, payment data 244a can include any data that the payment message generator 238a can use in connection with generating a payment message.

As briefly mentioned above, in addition to the sender client device 204a, the system 200 can further include the message system 210 that is in communication with the sender/recipient client devices 204a and 204b and the payment network 215, as shown in FIG. 2. Additionally, FIG. 2 illustrates that the message system 210 can include various components to allow a sender to send a payment to a recipient via the message system 210.

As FIG. 2 shows, the message system 210 can include, but is not limited to, a communication manager 250, a status manager 252, a payment manager 254, a payment network coordinator 256, and a storage manager 258. Each of the components 250-258 of the message system 210 may be in communication with one another using any suitable communication technologies. It will be recognized that although components 250-258 are shown to be separate in FIG. 2, any of components 250-258 may be combined into fewer components, such as into a single facility or module, or divided into more components as may serve a particular embodiment. In addition, the components 250-258 can comprise software, hardware, or a combination of hardware and software.

In order to communicate with systems and devices outside the message system 210, the message system 210 can include a communication manager 250. In one or more embodiments, the communication manager 250 that can send and receive electronic information to and from client devices 204. For instance, the communication manager 250 can receive and forward communication messages between the sender client device 204a and the recipient client device 204b. Additionally, the communication manager 250 can receive a payment message from the sender client device 204a, as well as send and/or receive payment status messages, status updates, and user actions, and other information that may be communicated between the client devices 204 and the message system 210 during a payment process.

As further illustrated in FIG. 2, the message system 210 can include a status manager 254. The status manager 254 can monitor, determine, or otherwise identify a status of a user on a client device 204. Specifically, the status manager 254 can monitor a user's activity on a client device 204 to determine if the user is present and/or available to communicate. For example, the status manager 252 can determine that a user is using a particular application, communicating via one or more communication platforms, or looking at the screen of the client device (e.g., by using image data passively collected from a digital camera located on the client device). One will appreciate that there are various other methods that the status manager 254 can use to determine the presence or availability status of a user on a client device.

In addition to monitoring and determining a user's status, the status manager 252 can provide a user's status to the communication manager 250, and the communication manager 250 can distribute a user's status information to various other users of the message system 210. For example, a sender can navigate to one or more user interfaces (e.g., a message thread, a contact list, and/or a payment interface) within the messaging application 230a on the sender client device 204a to view a recipient's status. The status manager 252 can determine a status of the recipient based on the recipient's activity on the recipient client device 204b, and the communication manager 250 can send the recipient's status to the sender client device 204a for presentation within the messaging application 230a.

Unlike conventional payment systems, the system 200 allows the sender to confirm whether or not the recipient is present and available prior to sending a payment. Allowing the sender to confirm that the recipient is present and available to respond to the payment reduces the potential for confusion about the payment. In addition, the fact that the recipient is present can increase the sender's confidence that the recipient actually received the payment because the recipient is available to respond the when the recipient receives the payment.

In one or more embodiments, the messaging application 230a can be configured (e.g., the sender selecting a user preference setting) to only send a payment to a recipient when the recipient is available. For example, a sender can define a payment to a recipient and provide an interaction intended to send a payment message. The messaging handler 236a, however, can identify that the recipient is not currently available, and in response the messaging handler 236a can hold the payment message until the recipient's status changes to available. In one or more embodiments, upon the recipient's status changing to available, the payment message is sent regardless of whether the sender's status (e.g., the sender's status has changed from available to unavailable). Alternatively, in the event the sender's status changes to unavailable prior to the recipient's status changing to available, the messaging handler 236a can hold the payment message until both the recipient and the sender are available.

As further illustrated in FIG. 2, the message system 210 can include a payment manager 254. In general, the payment manager 254 can initiate a payment process in response to the message system 210 receiving a payment message from the sender client device 204a. For example, the communication manager 250 can receive a payment message, detect the message is a payment message, and pass the payment message to the payment manager 254. Upon receiving a payment message, the payment manager 154 initiates a payment process that facilitates the payment defined within the payment information of the payment message.

In one or more embodiments, the payment process can include the payment manager 254 parsing the payment message to identify or otherwise extract payment information. Based on the payment information, the payment manager 154 can provide the payment information to the payment network coordinator 256 with instructions to initiate a transaction. The payment network coordinator 256 can initiate a transaction within the payment network 215 to fulfill the payment defined in the payment information (e.g., cause money to be transferred out of a sender account and deposited into a recipient account).

The payment manager 154 further monitors a payment process and coordinates communication regarding the payment process between the payment network coordinator 256, the communication manager 250, the sender client device 204a, and the recipient client device 204b. For example, the payment manager 254 can receive a status of a transaction from the payment network coordinator 256. In response to receiving the status, the payment manager 254 can direct the communication manager 250 to send an updated status communication to the sender client device 204a and/or the recipient client device 204b to update the sender status message and/or recipient status message.

In addition to coordinating payment process status information, the payment manager 252 can also coordinate the communication of information that the client devices 204 may send during the payment process. For instance, the communication manager 250 can receive information from the sender client device 204a and/or the recipient client device 204b during a payment process. In particular, the communication manager 250 can receive information from the sender client device 204a, or recipient client device 204b, indicating that the sender, or recipient, selected an action within a status message. For example, and as described above, the sender can interact with a sender status message to select a cancel action.

In one or more embodiments, the communication manager 250 can receive cancelation information from the sender client device 204a and provide the cancelation information to the payment manager 254. In response, the payment manager 254 can then cause the communication manager 250 to send a status update to the recipient client device 204b. Upon receiving the status update, for example, the messaging handler 236b can coordinate with the user interface manager 232b to update the payment status within the recipient status message to allow the recipient to see the payment was canceled.

Furthermore, in response to receiving the cancelation information, the payment manager 254 can cause the payment network coordinator 256 to cancel the transaction within the payment communication network 215. As part of a transaction cancelation process, the payment manager 254 can verify the transaction is canceled, update the transaction database 264, and close the payment instance within the message system 210. Therefore, the payment manager 254 manages the payment process between the sender client device 204a, the recipient client device 204b, and the payment network coordinator 256.

The payment manager 254 can perform various other additional steps and methods in order to effectively manage the payment process. In one or more embodiments, for example, upon receiving a payment message the payment manager 254 can generate a transaction identifier (or simply "transaction ID") and associate the transaction identifier with the payment message and/or the payment information within the payment message. For instance, upon generating a transaction ID, a transaction database 264 can maintain the transaction ID and associated transaction (e.g., payment) information 266. The transaction database 264 can include a data table or similar data matrix that stores transaction information according to transaction ID.

In one or more embodiments, after the payment manager 254 associates a transaction ID with a particular payment message, the transaction ID can be included or embedded within substantially all communications within system 200 relating to the particular payment. As such, a transaction ID allows the payment manager 254 to manage and process a large number of payments in an organized fashion. For example, the payment manager 254 can include instructions to include the transaction ID in any information sent to the client devices 204. In return, the messaging handlers 236 can also include the transaction ID in any information sent from the client devices 204 to allow the payment manager 254 to efficiently and reliably identify a particular transaction to which the information corresponds.

As discussed briefly above, the payment network coordinator 256 can cooperate with the payment manager 254 to coordinate a transaction corresponding to a payment defined in a payment message. As generally explained above, the payment network coordinator 256 can coordinate a transaction via the payment network 215 that corresponds to a payment message, monitor the status of the transaction, and provide status information regarding the transaction to the payment manager 254. More specifically, the payment network 215 can authorize a transaction, fund a transaction, and/or settle an individual transaction or batch of transactions as described above with reference to FIG. 1. In one or more embodiments, the payment network coordinator 256 can use one or more application programming interfaces (API) to communicate relevant information with the payment network 215.

To complete a transaction, the payment network coordinator 256 obtains recipient deposit account information in order to provide a payment to a recipient. The payment network coordinator 256 can obtain a recipient's deposit account information using a variety of methods. In one example embodiment, a recipient can register one or more deposit accounts via the message system 210. Upon a user registering a deposit account, the storage manager 258 can maintain the deposit account information (e.g., account number, routing number) in the user profile database 260.

After the payment network coordinator 256 receives the payment information from the payment manager 254, the payment network coordinator 256 can identify a recipient within the payment information. The payment network coordinator 256 can lookup the recipient in the user profile database 260 to determine if the recipient has registered a deposit account. If the recipient's profile includes deposit account information, the payment network coordinator 256 extracts the deposit account information and associates it with the corresponding payment information that identified the recipient. At this point, the payment network coordinator 256 can initiate the transaction.

In the event that the recipient's user profile does not include deposit account information, the payment network coordinator 256 can notify the payment manager 254 of the deficiency. In one or more embodiments, the payment manager can direct the communication manager 252 to send the recipient a message prompting the recipient to register a deposit account. For example, the message may prompt the recipient to register a deposit account by providing one or more interactive fields within the message that allows the recipient to provide deposit account details. For instance, the message may include a routing number field, an account number field, a bank name field, and a selectable option to send the deposit account information from directly within the message thread. Accordingly, the recipient can register a deposit account from directly within the messaging application 230b, and in particular, the recipient can register a deposit account from within the messaging thread that corresponds with the sender. Alternatively, the message may include a hyperlink that points to a registration webpage that allows the user to register a deposit account.

Additionally, or alternatively, upon determining that a recipient does not have a registered deposit account, the payment network coordinator can generate a temporary deposit account within the message system 210. In particular, the temporary deposit account allows the payment network coordinator 256 to proceed immediately to process a transaction without delaying the payment process from the perspective of either the sender or the recipient. In one or more embodiments, the payment network coordinator 256 can generate an account number and associate the account number with the recipient's user profile. In one or more embodiments, the recipient may already have a temporary account, and therefore, the payment network coordinator 256 can use the previously created temporary account to complete the transaction.

Upon completion of the transaction, the payment network coordinator 256 deposits the payment amount to the temporary deposit account. In one or more embodiments, the payment manager 254 can cause the communication manager 250 to send the recipient a message providing a hyperlink and/or instructions to transfer the money from the temporary account to a registered deposit account. Alternatively, if the recipient does not want to register a deposit account, the message system can provide the recipient instructions to withdraw the money from the temporary account.

In addition to coordinating a transaction via the payment network 215, the payment network coordinator 256 can also coordinate a transaction with respect to one or more system user accounts. In one or more embodiments, the message system 210 can support user cash accounts, such as gift card accounts, cash card accounts, or similar types of user accounts. The sender can specify the sender's user cash account as the method of payment, and likewise, the recipient can set the recipient's user cash account as the registered deposit account. Therefore, in at least some embodiments, the entire transaction, or substantially the entire transaction, can be processed within the message system 210.

In one or more embodiments, the system 200 can also allow a recipient to register a credit card account as a deposit account. For instance, the payment network coordinator 256 can format the transaction to debit a payment amount from a sender account and credit or apply the payment amount to a recipient's credit card account. More specifically, upon confirming authorization from the sender's payment account, the payment network coordinator 256 can send a refund request to credit a payment amount to a recipient's credit card account.

In one or more embodiments, the refund request can comprise an unreferenced refund request. An unreferenced refund request is a refund request that is not attached to a previous funding transaction with the user's credit card account. Most credit card providers allow for unreferenced refunds requests to be processed, which results in applying a credit in the amount of the refund request to a recipients credit card account. For example, in the event that a recipient has a negative balance on a credit card account, the refund request amount may be applied to the negative balance. Likewise, in the event that a recipient has a zero balance on a credit card account, the refund request amount would result in a positive credit card account balance that the recipient can spend against.

In one or more embodiments, the payment network coordinator 256 can organize and process batches of credit card funding requests and batches of credit card refunding requests. In particular, due to a variety of fee structures associated with credit card transactions, the payment network coordinator 256 can process batches of credit card funding and refunding requests to minimize potential fees.

As previously mentioned in the discussion above, and as shown in FIG. 2, the message system 210 can include the storage manager 258. As previously mentioned, storage manager 258 can include a transaction database 264 that maintains transaction information 266 for each payment message received via a sender client device 204a. For example, transaction information 266 can include a transaction ID associated with one or more sender identifiers, recipient identifiers, payment amounts, payment methods (e.g., sender accounts), deposit methods (e.g., recipient accounts), transaction history, current transaction status, as well as other transaction information.

In one or more embodiments, the transaction information is maintained in the form of one or more graph objects that are updated with any actions related to a transaction. For example, for each payment message the message system 210 receives, the payment manager 254 can create a graph object that maintains the relevant data and information pertaining to the received payment message. As the payment process continues, the payment manager 254 can update the graph object with updated information and data so that the graph object consistently reflects the current status of a payment via the message system 210.

In addition to transaction information 266, the transaction database 264 can include one or more types of temporary accounts 268. The temporary accounts 268 can function as a "hot wallet account" that provides funding for a deposit to be made into a recipient account prior to the settlement or actual funding from the senders account. For instance, with some payment methods, the funding process of the payment may take several hours or even days for money to be debited from the sender's account. However, a payment authorization request can verify and reserve funds to satisfy a payment. Thus, upon receiving a successful response to a payment authorization request, the payment network coordinator 256 can fund the payment amount from the temporary accounts 268 to provide a shorter time for the payment to arrive in the recipient's account (e.g., several seconds). Once the payment funds from the sender's account, the temporary account is renewed for the amount of the payment, less any applicable fees.

As further illustrated in FIG. 2, the storage manager 258 can also include a user information database 262. More specifically, users can create payment profiles within the message system 210 to allow the users to send and receive payments through the message system 210. Generally, a payment profile can include verified user accounts, account information, authorization data (PINS and/or passwords), and user defined default methods of payment. Each method of payment includes payment details, such as account numbers, expiration dates, security codes, bank information, routing and transfer numbers, and the like. The user payment profiles can further include an email address, physical addresses, and one or more methods of payment.

As discussed, the systems and components discussed above with reference to FIGS. 1-2 can allow users of a message system to easily, effectively, and securely send and receive payments via a message system. FIGS. 3A-4B illustrate example process diagrams of one or more example embodiments of processes implemented by systems 100 and/or 200 discussed above. In particular, FIGS. 3A-4B illustrate non-limiting examples of processes and methods a transactional payment system can use to facilitate payments between users of a message system.

Consistent with system 200, FIGS. 3A-4B illustrate a sender client device 204a with a messaging application 230a, a recipient client device 204b with a messaging application 230b, a server device 206 that provides a message system 210, and a payment network 215. Each of the sender/recipient client devices 204a/204b, server device 206, and payment network 215 can include one or more characteristics, functions, and/or features discussed above with reference to FIGS. 1-2, in addition to the characteristics, functions, and/or features discussed below. For ease of explanation, FIGS. 3A-4B illustrate processes for payments made between users that have previously setup payment accounts within the message system 210.

In one or more embodiments, a process for a user sending a payment to another user via the message system 210 can begin with a sender user (or simply "sender") associated with the sender client device 204a providing user input to the messaging application 230a to generate a payment message 302. In particular, and as described above, the sender can access one or more user interfaces that allow the sender to define a payment to be made to a recipient user (or simply "recipient"). In addition, the messaging application 230a can cause the sender client device 204a to send the payment message 304 to the message system 210, as shown in FIG. 3A.

Figure 3A:
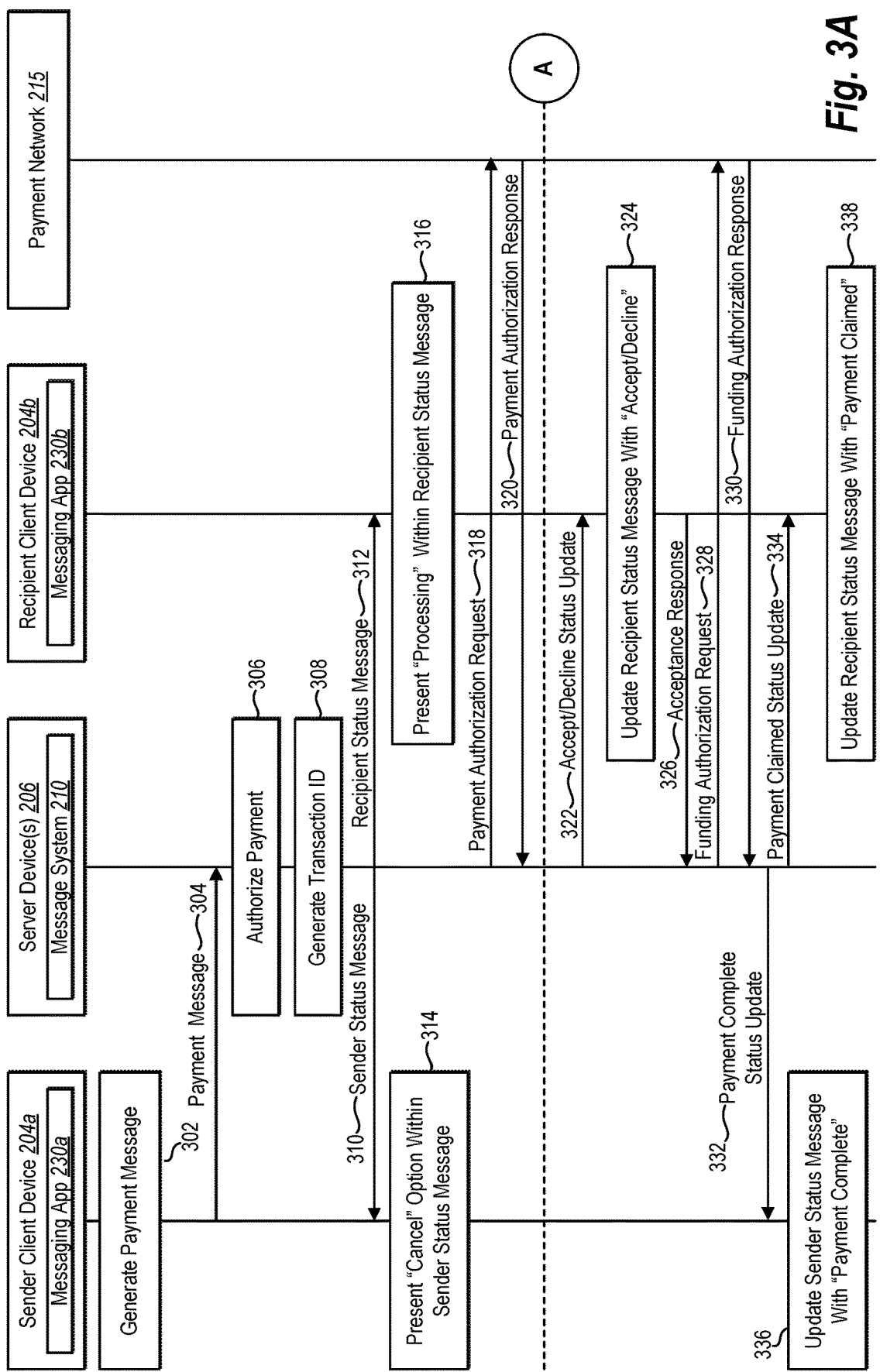
FIGS. 3A-3B illustrate a process flow diagram of processing a payment between a sender and a recipient in accordance with one or more embodiments.

The message system 210 can receive the payment message and the message system 210 can use one or more components (as described above) to identify the authorization information within the payment message to authorize the payment 306, as illustrated in FIG. 3A. In one or more embodiments, the payment message can contain an authorization code that the sender input within the messaging application 230a. The message system 210 can identify the authorization code within the payment message, and verify the authorization code matches a verification code within a user profile.

In addition, or alternatively, the message system 210 can authorize a payment by verifying other types of data, for example, a sender client device 204a ID, user ID, payment method credentials, or other verification data (e.g., digital finger print data obtained from a finger print reader on the sender client device 204a). Although FIG. 3A illustrates that the message system 210 authorizes the payment 306, in one or more embodiments, the sender client device 204a can authorize the payment 306 prior to sending the payment message. For example, the messaging application 230a can verify the authorization code, or communicate with a remote service to verify an authorization code, prior to sending the payment message.

In the event that the message system 210 does not authorize the payment, e.g., the authorization code cannot be verified, the message system 210 can send a communication to the sender client device 204a to cause the messaging application 230a to present an error message to the sender that indicates the payment could not be authorized. In one or more embodiments, the error message can include a prompt for the sender to reenter authorization information, after which the sender client device 204a can send a revised payment request with the reentered authorization code to the message system 210. The message system 210 can then attempt to authorize the payment with the reentered authorization code. If the message system 210 cannot authorize the payment, then the payment process terminates.

Upon the message system 210 authorizing the payment 306, the message system 210 can generate a transaction ID 308, as illustrated in FIG. 3A. As described above, the message system 210 associates a unique transaction ID to each payment message received, and can include the transaction ID within various files, objects, messages, and other information to allow the message system 210 to efficiently identify and process messages, status updates, and other information with respect to each payment made via the message system 210. For example, and as described above, the message system 210 can associate the transaction ID with a graph object that maintains information that corresponds to processing a payment message.

As FIG. 3A further illustrates, the message system 210 can provide a sender status message 310 to the sender client device 204a. For example, the sender status message 310 can include a sender message and/or available sender actions that correspond to a particular status of the payment process. In addition, the message system 210 can send a recipient status message 312 to the recipient client device 204b. The recipient status message 312 can include a recipient message and/or available recipient actions that correspond to a particular status of the payment process.

Upon the sender client device 204a and the recipient client device 204b receiving the status messages from the message system 210, each device can present the status messages. In particular, FIG. 3A illustrates the sender client device 204a can present a "cancel" option within the sender status message 314, along with other information that identifies one or more portions of payment information. For example, and as will be explained further below with reference to FIGS. 5A-7C, the second client device 204a can present the sender status message 314 within the message thread corresponding to a messaging session with the recipient. The "cancel" option within the status message allows the sender to cancel the payment during various stages of the payment process. In general, the "cancel" option is available to the sender until the payment is complete.

In addition, FIG. 3A illustrates the recipient client device 204b can present a "processing" message within the recipient status message 316, along with other information that identifies one or more portions of payment information. The "processing" message indicates to the recipient that a payment is in process. In particular, the "processing" message is relevant as the message system 210 communicates with the payment network 215 to authorize the payment. As with the sender status message, the recipient client device 204b can present the recipient status message within a message thread on the recipient client device 204b corresponding to a messaging session with the sender.

In addition to providing the sender and recipient status messages, the message system 210 can send a payment authorization request 318 to the payment network 215. As described in detail above, the payment authorization request includes payment information that allows the payment network 215 to verify the payment account the sender specified as the payment method. Additionally, the payment network 215 can verify the payment account has sufficient funds to cover the payment amount, as well as request a hold on funds in the payment amount to be applied to the payment account. In one or more embodiments, the payment authorization request 318 can also include payment information that causes the payment network 215 to verify that the recipient account is available to accept a payment.

As described in detail with reference to FIG. 1, the payment network 215 can authorize the payment. Upon authorizing the payment, the payment network 215 can send the message system 210 a payment authorization response 320 that indicates the payment is authorized, as illustrated in FIG. 3A. Alternatively, in the event the payment network 215 cannot authorize the payment, the payment network 215 can send the message system 210 a payment authorization response 320 that indicates the payment was not authorized.

When the payment network 215 cannot authorize a payment, the message system 210 can send a status update to both the sender client device 204a and the recipient client device 204b that indicates the payment failed. The status update can include data that indicates a reason for the failed payment, as well as one or more options that allow the sender or recipient to correct the reasons for failure, if possible. For instance, when the payment network 215 cannot authorize a payment due to a problem associated with the sender's payment account, the sender status update can include a description of the problem with the sender's payment account. In such an instance, the status message sent to the recipient client device 204b may not include the description of the problem to protect the sender's information and reputation (e.g., when the reason for payment failure is due to insufficient funds in the sender's payment account).

Returning to FIG. 3A, when the payment authorization response indicates that the payment is authorized, the message system 210 can send an "Accept/Decline" status update to the recipient client device 204b. Upon receiving the status update, the recipient client device 204b updates the recipient status message 324 to include a selectable option to accept or decline the payment. Upon the recipient interacting with the selectable option to accept the payment, the recipient client device 204b can send an acceptance response 326 to the message system 210. As an alternative to the process illustrated in FIG. 3A, the process may not include the steps shown to allow the recipient to accept or decline the payment. Rather, the process can proceed directly to sending a funding request to facilitate the payment without any additional user interaction from the recipient.

Figure 4A:
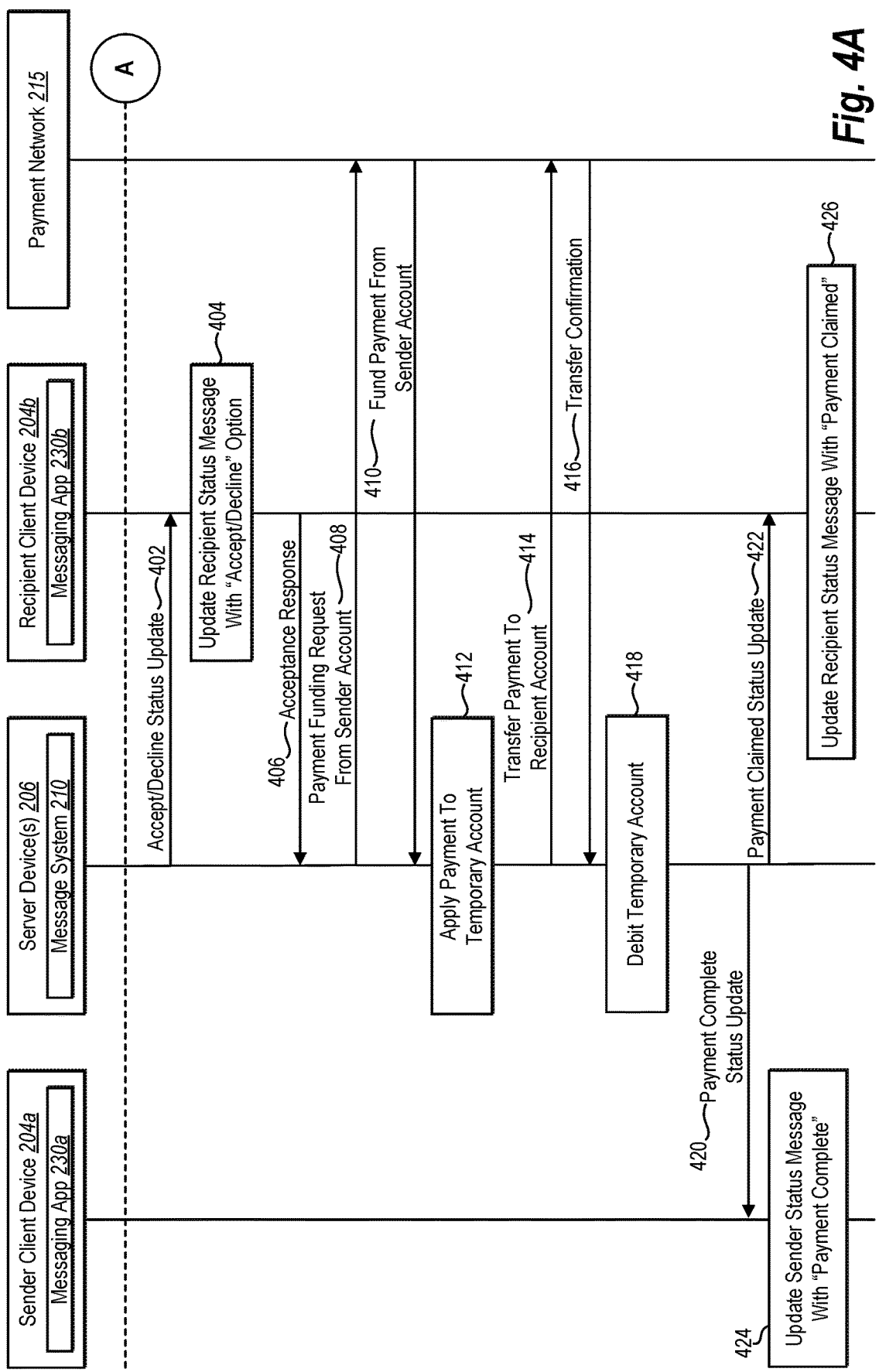
FIGS. 4A-4B illustrate another process flow diagrams of additional ways to process payments between a sender and a recipient in accordance with one or more embodiments.
Figure 4B:
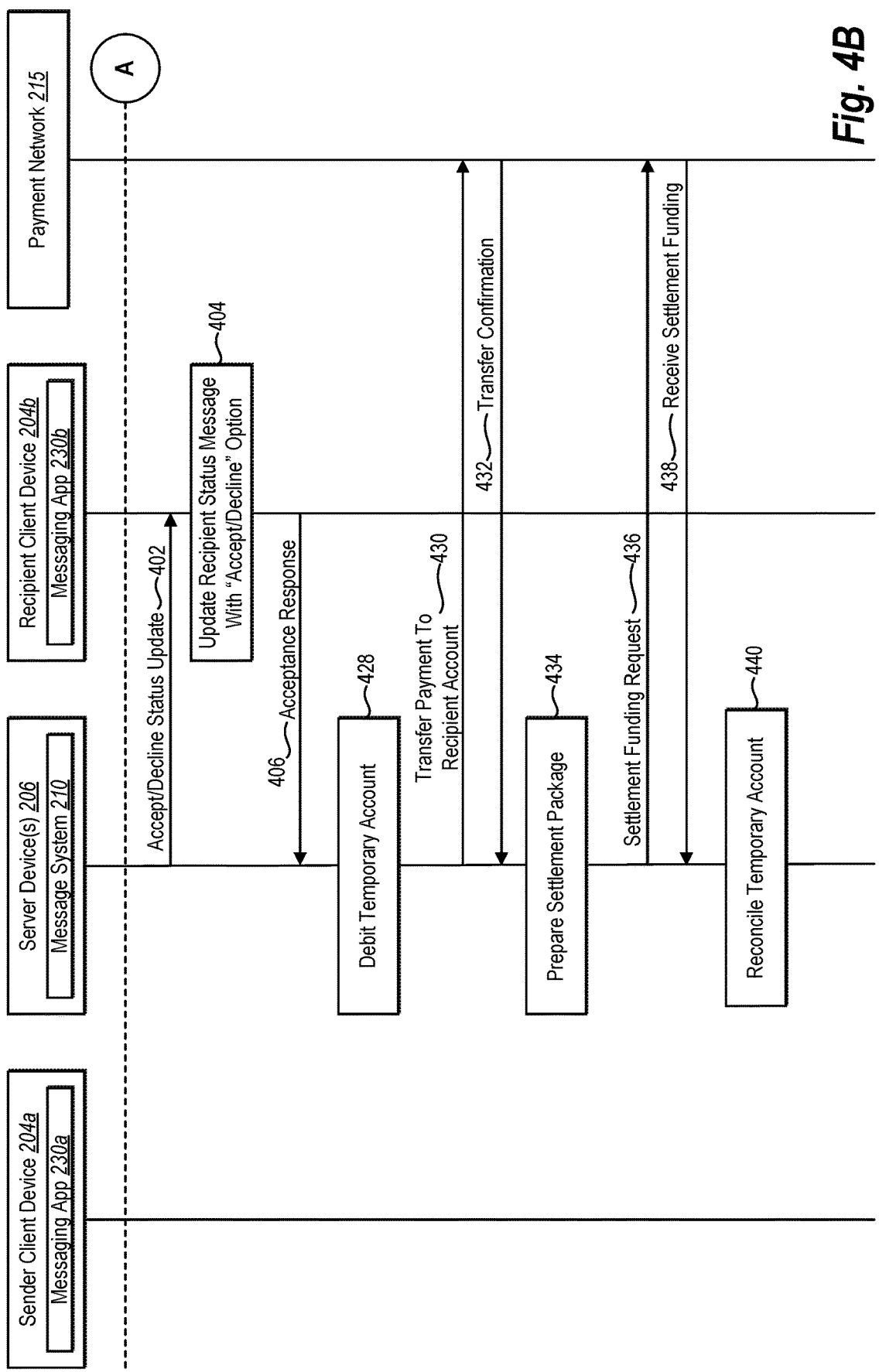

Continuing with FIG. 3A, upon the message system 210 receiving the acceptance response from the recipient client device 204b, the message system 210 can then send a funding authorization request 328 to the payment network 115 to process the funding of the payment. In particular, the funding authorization request can provide payment information and instructions to transfer the payment amount from the sender's payment account to the recipient's deposit account, as discussed with reference to FIG. 1. Depending on the method of payment type (e.g., the payment account type) and the deposit account type, the funding of the payment may take various forms. FIGS. 4A-4B discuss additional process for funding the payment, and will be discussed below.

Upon funding the payment, the payment network 215 can send the message system 210 a funding authorization response 330, as shown in FIG. 3A. Specifically, the funding authorization response 330 can indicate the funding of the payment was successful. The message system 210 can then send a payment complete status update 332 to the sender client device 204a, which causes the sender client device 204a to update the sender status message with a "Payment Complete" message 336. Likewise, the message system 210 sends a payment claimed status update 334 to the recipient client device 204b, which causes the recipient client device 204b to update the recipient status message with a "Payment Claimed" message 338. At this point, the payment process is complete.

Figure 3B:
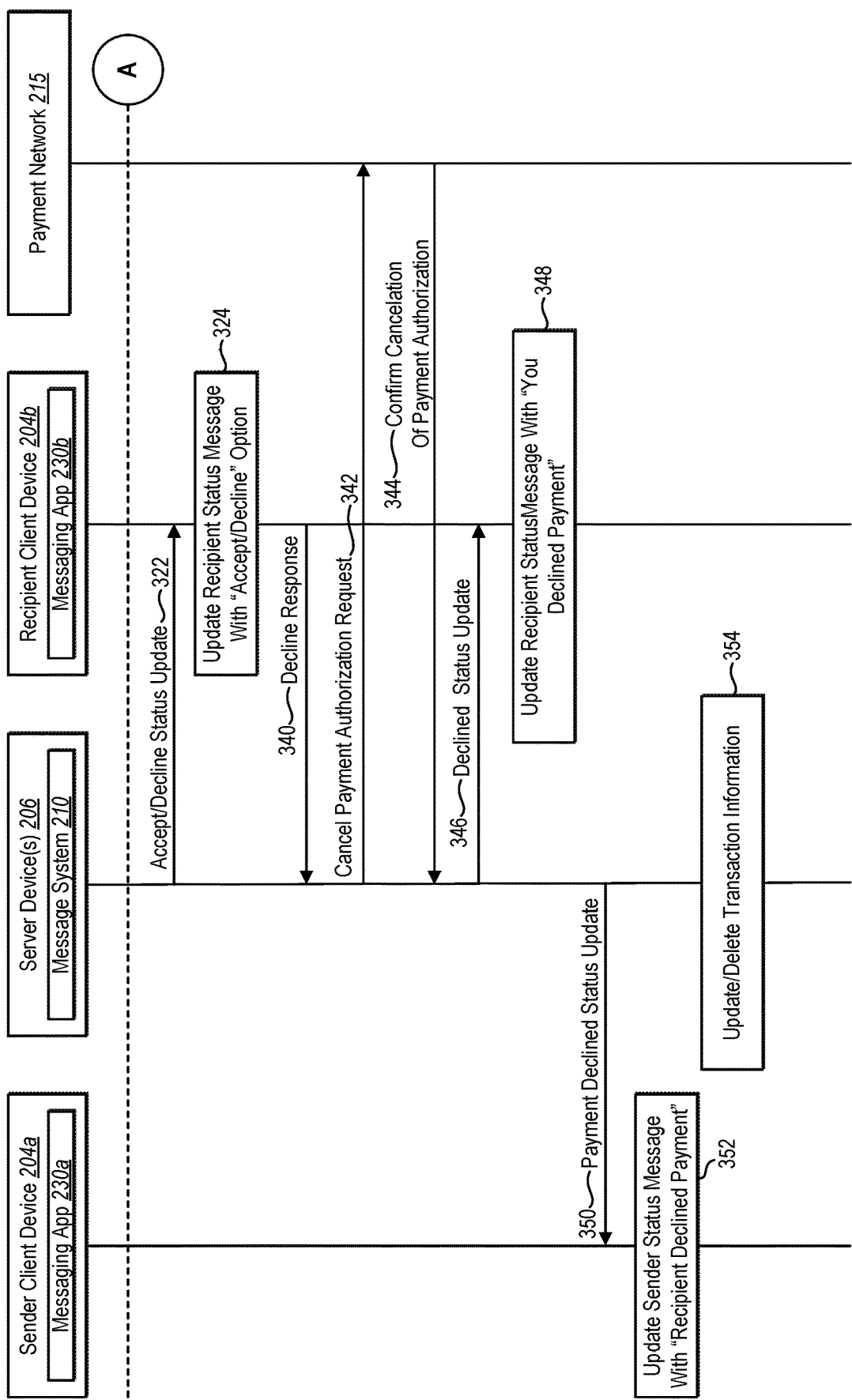

FIG. 3B illustrates an example process flow in the event that the recipient declines a payment. In particular, the process flow shown in FIG. 3B resumes at point A of FIG. 3A, or in other words, after the message system 210 has received the payment authorization response. As described above, after receiving the payment authorization response, the message system 210 can send an accept/decline update 322, which causes the recipient client device to update the recipient status message with selectable options to accept or decline the payment 324.

As further shown in FIG. 3B, the recipient client device 204b can send a decline response to the message system 210 upon the recipient selecting the decline option. The message system 210 can start a payment cancelation process upon receiving the decline response from the recipient client device 204b. In particular, the message system 210 can send the payment network 215 a cancel payment authorization request 342 that includes information and instructions to cancel the approved authorization request. For example, the payment network 215 can remove any holds on funds or cancel any other pending items caused by the authorization request. The payment network 215 can then send the message system 210a confirmation that the payment network 215 canceled the payment authorization request 344.

Additionally, after receiving the decline response from the recipient, the message system 210 can also send a declined status update 346 to the recipient client device 204b, which causes the recipient client device 204b to update the recipient status message with a "You Declined this Payment" message 348, or other similar language. The message system 210 can also send a payment declined status update 350 to the sender client device 204a, which causes the sender client device 204a to update the sender status message with a "Recipient Declined Payment" message 352, or other similar language. A similar process occurs in the event the sender elects to cancel a payment prior to the payment process completing.

The message system 210 can also take additional steps to cancel the payment process within the message system 210. In particular, the message system 210 can update or delete any transaction information 354. For example, the message system 210 can delete or archive the payment information, as well as any other data or information that corresponds to the canceled payment.

FIGS. 4A-4B illustrate additional examples of a payment process, and in particular additional examples of funding processes to allow the message system 210 to process payments using a wide variety of payment methods and deposit accounts. FIG. 4A illustrates an example process flow that separately processes the funding request from the sender's account and depositing the payment in the recipient's account. In one or more embodiments, for example, the sender's account may be accessible on a first payment network, while the recipient's account is available on a second payment network. In such a situation, in order to process the payment, the message system 210 can act as an intermediary for processing the payment.

The process flow shown in FIG. 4A resumes at point A of FIG. 3A, or in other words, after the message system 210 has received the payment authorization response. As described above, after receiving the payment authorization response, the message system 210 can send an accept/decline status update 402, which causes the recipient client device to update the recipient status message with selectable options to accept or decline the payment 404. The client device 204b can send an acceptance response 406 to the message system 210 in response to the recipient selecting the accept payment option.

Once the recipient accepts the payment, the message system 210 can send a funding request 408 to the payment network 215 that requests the payment amount to be debited from the sender's account and sent to the message system 210. In response, the payment network 215 can fund the payment from the sender's account 410 by electronically transferring money from the sender's account to the message system 210. Upon receiving the electronic transfer, the message system 210 can apply the payment to a temporary account 412. In one or more embodiments, the message system 210 can create a new account to which to apply the payment. Alternatively, the message system 210 can apply the payment to a master temporary account that includes various other payments organized and identified by the unique transaction ID associated with each payment.

The message system 210 can then deposit the payment into the recipient's deposit account. In particular, and as illustrated in FIG. 4A, the message system 210 can electronically transfer the payment to the recipient's account 414 via the payment network 215, or another payment network. The payment network 215 sends a transfer confirmation 416 to the message system 210 upon successfully depositing the payment into the recipient's account. After receiving the transfer confirmation 416, the message system then debits the temporary account 418 for the payment amount 418, and thereby reconciles the temporary account with respect to the payment.

To complete the payment process, the message system 210 can send a payment complete status update 420 to the sender client device 204b and a payment claimed status update 422 to the recipient client device 204b. Additionally, the sender client device 204a updates the sender status message with a "Payment Complete" message 424, while the recipient client device 204b updates the recipient status message with a "Payment Claimed" message 426, as illustrated in FIG. 4A.

FIG. 4B illustrates yet another example of a payment funding process to facilitate the payment from the sender to the recipient. In particular, FIG. 4B illustrates an example funding process that the message system 210 can use when the sender selects a payment method that has a slow or delayed funding process. Generally speaking, user's of a payment system become frustrated by a slow payment process. Thus, FIG. 4B illustrates an example process to provide a fast payment process, even when the payment method has a slow or delayed funding process.

The process flow shown in FIG. 4B resumes at point A of FIG. 3A, or in other words, after the message system 210 has received the payment authorization response. As described above, after receiving the payment authorization response, the message system 210 can send an accept/decline status update 402, which causes the recipient client device to update the recipient status message with selectable options to accept or decline the payment 404. The client device 204b can send an acceptance response 406 to the message system 210 in response to the recipient selecting the accept payment option.

Based on the type of payment method indicating a slow funding process, the message system 210 can debit a temporary account 428 maintained within the message system 210 in the amount of the payment and electronically transfer the payment to the recipient's account 430 via the payment network 215. The payment network 215 can send a transfer confirmation 432 indicating a successful transfer. Therefore, based on receiving a successful response to a payment authorization request (see FIG. 3A), the message system 210 advances the payment to the recipient's account prior to the payment amount actually being debited from the sender's account.

At this point, the messaging system can send status updates to the sender client device 204a and the recipient client device 204b indicating that the payment process is complete and that the recipient has claimed the payment, as described above with respect to FIG. 4A. The sender client device 204a and the recipient client device 204b can update the sender status message and the recipient status messages to indicate the completion of the payment process, and although the payment has technically not yet funded, from the perspective of the sender and the recipient, the payment process is complete.

As further indicated in FIG. 4B, the message system 210 can prepare a settlement package 434. For example, in one or more embodiments, due to the slow nature of a payment method, the message system 210 may accumulate multiple payments of the same type to include within a settlement package that processes the multiple payments in a single settlement transaction. Next, the message system 210 can send a funding request 436 to the payment network 215, and the payment network 215 can fund the funding request 438 by electronically transferring funds in the amount of the funding request to the message system 210. The message system 210 can then complete the payment process by reconciling the temporary account 440, or in other words, replenishing the temporary account.

FIGS. 5A-7C illustrate one or more embodiments of a graphical interface that a message system can provide to allow users to send and receive payments from other users. Although FIGS. 5A-7C illustrate examples embodiments of a graphical interface on a mobile device, the graphical interface features and characteristics can be applied on various other client devices to provide the same or similar functionality and user experience.

FIGS. 5A-5C and 5H illustrate a mobile device 500a of a sender and FIGS. 5D-5G illustrate a mobile device 500b of a recipient. Generally, each mobile device 500a and 500b includes a touch screen 502 that presents a graphical interface 504 having the same or similar features. In addition, and as illustrated in FIG. 5A, the graphical interface 504 can include, but not be limited to, a navigation bar 505, a messaging thread 506 that includes one or more messages 508, an input area 510, a menu 512 of selectable elements including a payment element 514, a send element 516, and an input keyboard 518, all of which can be responsive to user interactions detected via the touch screen 502. Each of the above graphical interface 504 features and characteristics will be discussed in more detail below.

As mentioned, FIG. 5A illustrates the navigation bar 505 can include the name or identity of the user with whom the sender is communicating. For convenience, the sender's mobile device 500a indicates the recipient's name as simply "Recipient Name," and likewise, the recipient's mobile device 500b indicates the sender's name as simply "Sender Name." In the event the communication session includes more that two users, the navigation bar 505 can include multiple names or identities that correspond to the multiple users participating in the communication session.

In addition to the name or identity of the user, FIG. 5A illustrates that the navigation bar 505 can include a status indicator located below the name. As illustrated, the status indicator can allow the sender user to know whether or not the recipient is currently active on the recipient's mobile device 500*b*. In addition, the status indicator can indicate how the recipient is active (e.g., messaging, phone, web browser). Thus, the sender can verify that the recipient is available to receive a payment prior to sending a payment.

The navigation bar 505 can further include various other selectable elements that provide navigation functionality. For example, as illustrated in FIG. 5A, the navigation bar 505 can include a "back" navigation button that navigates to a contact list or other interface within the message application. Furthermore, the navigation bar 505 can include a selectable phone element that allows the sender to call the recipient from directly within the messaging application. The navigation bar 505 can include various other features and characteristics.

As mentioned previously, the graphical interface 504 can include the messaging thread 506 that includes one or more messages 508, as shown in FIG. 5A. In one or more embodiments, the message thread 506 can organize the messages 508 to distinguish between sent messages and received messages. For example, FIG. 5A illustrates the received messages are aligned to the left and are in a first shade, while the sent messages are aligned to the right and are in a second shade. Additionally, the received messages can correspond to a user icon within the message thread that further indicates the identity of the user that sent the message, as shown in FIG. 5A.

To compose and send a message, the sender can interact with the keyboard 518 to provide user input to the input area 510. For instance, and as illustrated in FIG. 5A, the sender has input text into the input area 510. To send the message, the user can then interact with the send element 516. In addition to inputting text, the sender can also interact with one or more elements on the menu 512 to add other types of content to a message. For example, FIG. 5A illustrates that the menu 512 can allow a user to navigate to one or more interface features that allow a user to send text, capture and send a new image/video, send a saved image/video from a gallery, send one or more symbols or emoticons.

In addition to the above selectable elements, the menu 512 can include a selectable payment element 514, as illustrated in FIG. 5A. The sender can interact with the payment element to send a payment to the recipient. In one or more embodiments, the sender can include a message with the payment. For example, the sender can input text in to the input area, but instead of interacting with the send element 516, the sender can provide an interaction (e.g., a tap gesture) to the payment element 514, as shown in FIG. 5A. The text (or other content, e.g., images, videos, audio, emoticons, or other symbols) located within the input area 510 at the time the user selects the payment element 514 may be included within the payment message, as well as within the sender and recipient payment status messages (see FIGS. 5C and 5D).

In one or more embodiments, in response to the sender interacting with the payment element 514, a messaging application on the mobile device 500*a* can communicate with a message system to determine if the sender is associated with a registered payment account within the messaging system. In the event the sender is not associated with a registered payment account, a messaging application can present a graphical interface that allows the sender to register a payment account (e.g., provide payment information as described in detail above). Alternatively, or additionally, a graphical interface can present a one-time payment option that allows a user to input payment information to facilitate a one-time payment (e.g., enter a debit card or credit card number), without requiring the sender to create an account.

If the sender has already setup a payment account with the messaging system, then in response to the sender interacting with the payment element 514, a messaging application can transition the graphical interface 504 to allow the sender to define a payment, as illustrated in FIG. 5B. For example, the navigation bar 505 can change from presenting the recipient name to presenting the text "Send Money," or another similar message or symbol, to indicate the sender can define a payment via the graphical interface 504. Additionally, and as shown in FIG. 5B, the navigation bar 505 can include a selectable cancel option with which the sender can interact to return to the message thread 508 without defining and/or sending a payment.

The graphical interface 504 can further include various input fields that allow a sender to define a payment. For example, and as illustrated in FIG. 5B, the graphical interface 504 can include, but not be limited to, a recipient input field 520, a payment input field 522, an authorization code input field 524, a payment method selector 526, and a send payment element 528. In addition, the graphical interface 504 can include a number pad 530. The sender can interact with each field, selector, and/or element to quickly and efficiently define a payment.

In one or more embodiments, one or more of the fields and/or options are prepopulated/preselected. For example, FIG. 5B illustrates that the recipient input field 520 is prepopulated with the Recipient Name based on the sender selecting the payment element 514 (see FIG. 5A) within the message thread corresponding to the recipient. In the event the messaging thread corresponds to multiple recipients, the recipient input field 520 may be prepopulated with each of the multiple recipients. Additionally, the sender can interact with the recipient input field 520 to add or remove recipients. For instance, the sender can provide a tap gesture with respect to the recipient input field 520, and in response the messaging application can present a contact list of other users (e.g., the sender's friend list) that the sender can selectively add or remove as a recipient.

As further illustrated in FIG. 5B, the sender can input a payment amount via the payment input field 522 and the number pad 530. In the event of multiple recipients, a payment input field may include an input area corresponding to each of the multiple recipients. The payment input field may also include various other graphical features to provide one or more additional payment amount options as described above with reference to FIG. 2 (e.g., group payment options). Similarly, the sender can provide an authorization code via the authorization code input field 524 using the number pad 530.

As described above, in one or more embodiments, the sender can define a default payment method to use for payments. The sender, however, can interact with the payment method selector 526 to change to a different method of payment. Upon interacting with the payment method selector 526, for example, the messaging application can present a list of other registered payment methods, as well as present an option to add a new payment method. The sender may then interact with one or more of the other payment methods to define the payment method. The graphical interface 504 can include additional graphical elements and features that allow a sender to further define a payment using one or more of the methods or processes described herein.

After the sender defines the payment, the sender can then interact with the send payment element 528, as illustrated in FIG. 5B. As described above, upon the sender interacting with the send payment element 528, the messaging application can cause the mobile device 500a to send a payment message with the defined payment information to a messaging system. The messaging system can then perform a payment process, including exchanging various electronic communications with the sender's mobile device 500a and the recipient's mobile device 500b.

For example, upon receiving a payment message, a message system can respond by sending the sender's mobile device 500a a sender status message 550, as illustrated in FIG. 5C. A messaging application on the mobile device 500a can add the sender status message 550 to the message thread 506 as a message that the sender sent. In particular, even though the messaging system generated and sent the sender status message 550, because the payment originated from the sender, the sender status message appears as the sender's message.

As mentioned, the sender status message 550 can include content the sender input into the input area 510 prior to sending the payment message. For example, FIG. 5C illustrates the sender status message 550 includes the text message shown in the input area 510 of FIG. 5C. Additionally, or alternatively, the sender status message can include default text that identifies the payment (e.g., "You are sending a payment to Recipient"). In the event there are multiple recipients, the sender status message may include each of the recipient's names and the payment amount corresponding to each recipient. Alternatively, the message system may send a separate sender status message for each of the multiple recipients.

As briefly mentioned, the sender status message 550 can include the payment amount (e.g., $30.00). In one or more embodiments, the payment amount can be a selectable element that allows the sender to modify the payment amount from directly within the message thread 506. For instance, the sender may send a payment in the amount of $30.00. In response, the recipient may send an instant message to the sender that explains the payment is for the wrong amount. The sender may interact with the payment amount selectable element and modify the payment amount. Upon modifying the payment amount, the mobile device 500a sends a communication to the messaging system, which then updates the payment information with the new payment amount.

The sender status message 550 can further include one or more selectable elements related to the payment. For example, FIG. 5C illustrates that the sender status message 550 includes a selectable cancel element 552. As explained above in detail, the sender can interact with the cancel element 552 to cancel the payment at various points within the payment process.

FIG. 5D illustrates the recipient's mobile device 500b. In particular, FIG. 5D illustrates a recipient status message 560 that the recipient's mobile device 500b received from the messaging system upon the sender sending the payment message. As with the sender status message 550, the recipient status message 560 can include content (e.g., text), and a payment amount. The recipient status message 560 can include the same or similar features as described above with respect to the sender status message 550.

In addition, the recipient status message 560 can include a status indicator 562 that indicates the status of the payment. For example, upon initially receiving the recipient status message 560, the messaging system can be attempting to authorize the payment (see FIG. 3A). While the authorization process is proceeding, the recipient status message 560 can include the status indicator 562 that informs the recipient the payment is processing.

With further reference to FIG. 5E through 4G, the messaging system can send a status update to the recipient's mobile device 500b to update the recipient status message 560 with an accept element 564 and a decline element 566, which signifies that the message system successfully authorized the payment. The accept element 564 and the decline element 566 provide the opportunity to the recipient to accept or decline the payment. In one or more embodiments, the payment process proceeds without providing the recipient an option to accept or decline the payment.

Upon receipt of the selection of the accept indicator 564, as illustrated in FIG. 5E, the messaging system can provide a status update to cause the recipient status message 560 to include a status indicator 568 to inform the recipient the payment process is proceeding. For example, and as shown in FIG. 5F, the status indicator 568 can include a text status, such as "Processing Transaction." Other language, symbols, graphics, or animations can indicate the processing funds for the transaction. For example, in one or more embodiments, as the messaging system is processing the funds, the sender and/or recipient status messages can include an animation indicating the transfer of money from the sender to the recipient. An example animation may include an animated counting of cash in the amount of the payment, illustrating the immediate nature of the payment process as well as entertaining the users while the messaging system completes the funding process.

Upon completion of the funding process, a status update from the message system can cause the recipient status message 560 to include a status indicator 570 indicating the recipient successfully received the payment, as illustrated in FIG. 5G. Likewise, a status update from the message system can cause the sender status message 550, shown in FIG. 5H, to include a status indicator 572 indicating the successful completion of the payment.

In one or more embodiments, the sender and recipient can continue to exchange messages throughout the entire payment process. Messages sent after the sender and recipient status messages 550, 560 were sent can appear in a newest message position, or below the status messages in the message thread 506 (e.g., older messages move up in the message thread 506 with the addition of new messages). In some example embodiments, upon receiving a status update related to the payment, the messaging application reassigns the position of the status messages 550, 560 within the message thread 506 to the newest message position. Likewise, the messaging application may notify the sender and recipient of a status update in the same way it notifies the sender and recipient of a new message. In this way, the sender and recipient can continue to communicate in real-time during a payment process, and well as monitor the progression of the payment process.

Furthermore, upon a successful completion of a payment, the sender status message 550 and the receiver status message 560 may include a link or other reference to the payment details. For example, the sender can provide an interaction (e.g., touch and hold gesture) to a sender status message 560 that indicates the payment was successful. In response, the messaging application can retrieve and present the additional payment details, for example, the transaction ID, payment method, and any other payment information. Similarly, the recipient can interact with the completed recipient status message to obtain additional payment details, for example, the recipient deposit account name or other payment information.

Figure 6C:
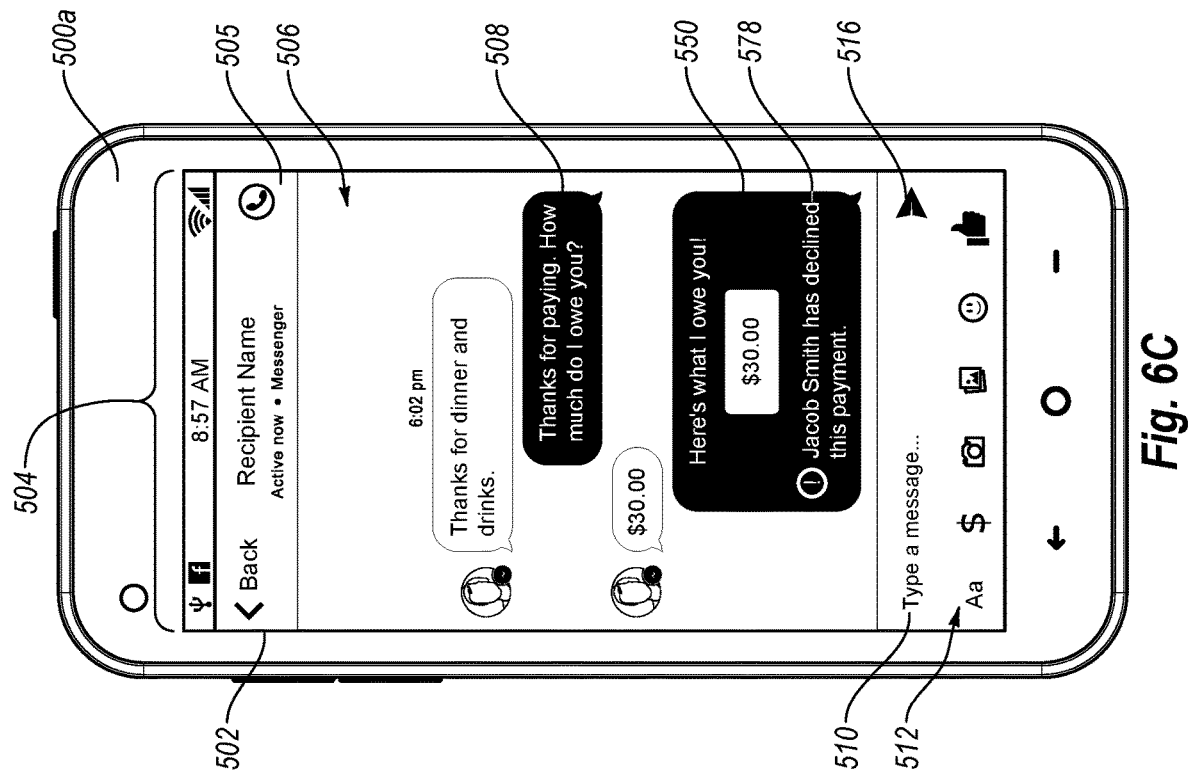

FIGS. 6A-6C illustrate example embodiments of the sender status message 550 and the recipient status message 560 when the payment is declined by the recipient. For example, when the recipient selects the decline element 574, shown in FIG. 6A, a status update from the messaging system can cause the recipient status message 560 to indicate the payment has been declined, e.g., "You declined this payment," as illustrated in FIG. 6B. Likewise, a status update from the messaging system to the sender mobile device 500a can cause the sender status message 550, illustrated in FIG. 6C to inform the sender that the recipient declined the payment, e.g., "Recipient has declined this payment."

Figure 7C:
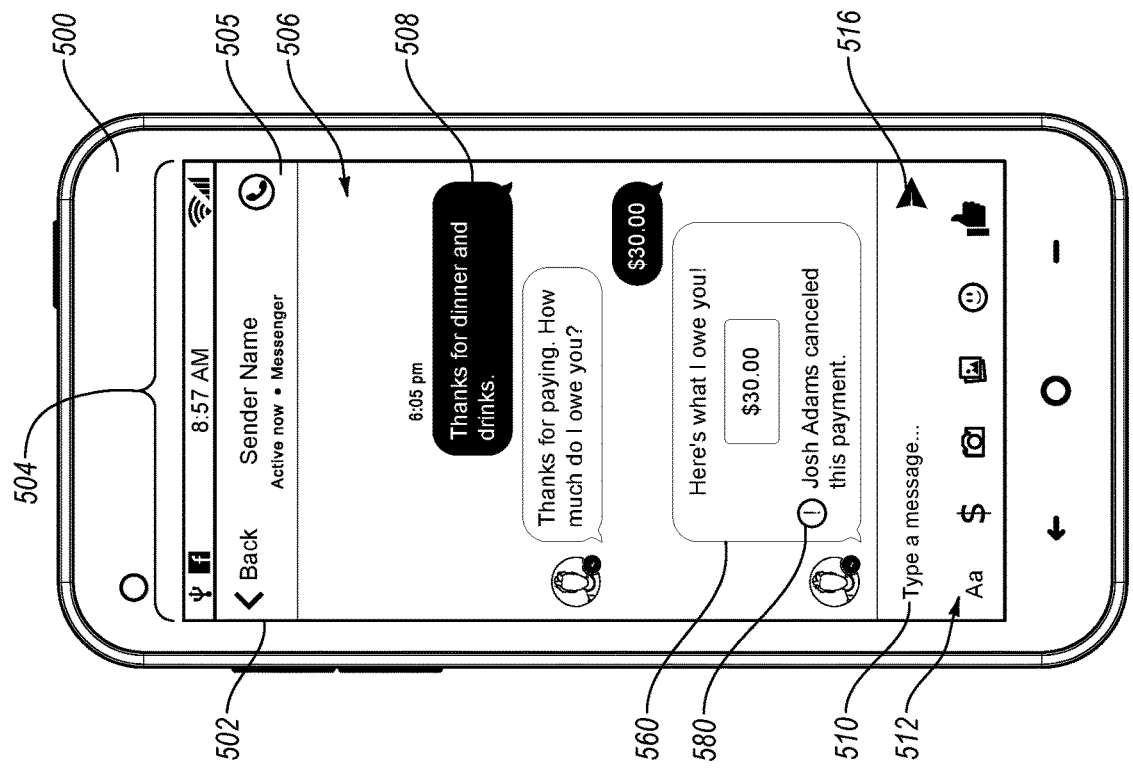

FIGS. 7A-7C illustrate example embodiments of the sender status message 550 and the recipient status message 560 when the sender cancels the payment process. As show in FIG. 7A, the sender can select the cancel element 552 to cancel the payment. In response, the messaging system can cancel the payment process, and send a status update to the sender's client device 500a. As illustrated in FIG. 7B, the status update can cause the sender status message 550 to indicate cancellation, e.g., "You canceled this payment." Likewise, and as illustrated in FIG. 7C, a status update from the messaging system to the recipient's client device can update the recipient status message 560 to indicate the canceled the payment, e.g., "Sender canceled this payment."

FIGS. 1-7C, the corresponding text, and the examples, provide a number of different systems, processes, and devices for sending payments via a messaging system. In addition to the foregoing, one or more embodiments can be described in terms of flowcharts comprising acts and steps in a method for accomplishing a particular result. For example, FIGS. 8-9 illustrate flowcharts of exemplary methods in accordance with one or more embodiments.

Figure 8:
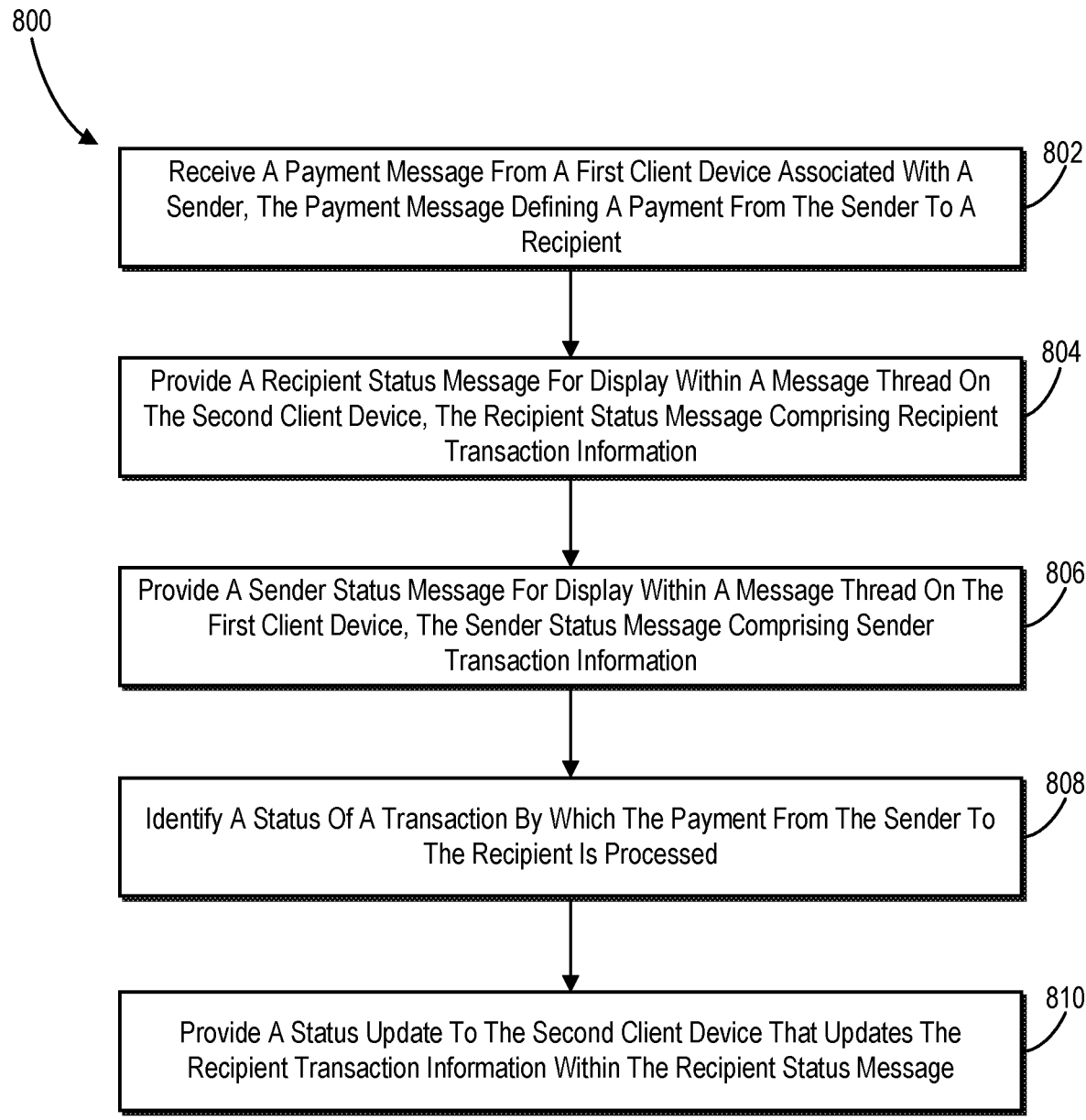
FIG. 8 illustrates a flow chart of a method of processing a payment between users of a messaging system in accordance with one or more embodiments.
Figure 9:
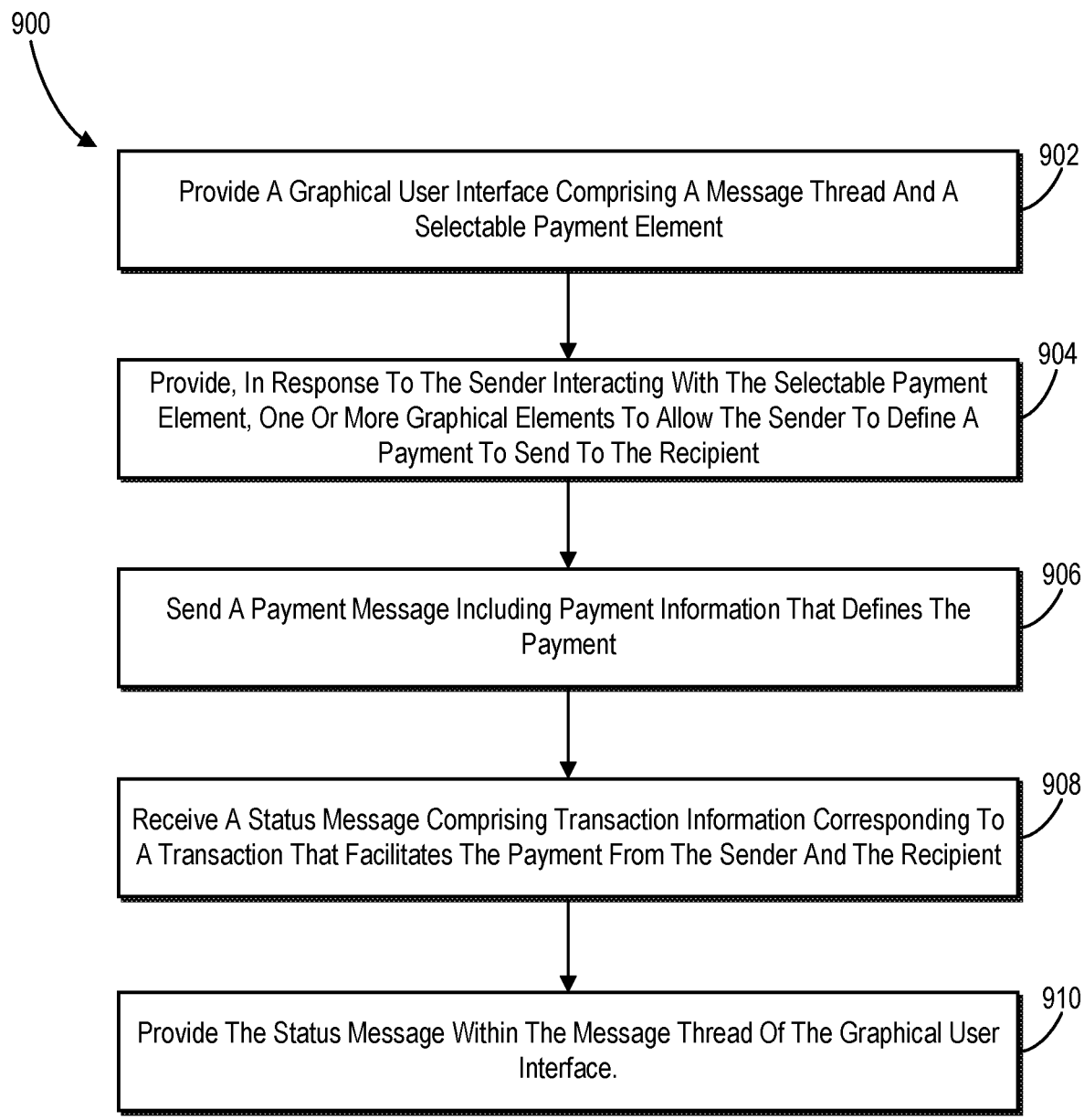
FIG. 9 illustrates a flow chart of another method of processing a payment between users of a messaging system in accordance with one or more embodiments.

FIG. 8 illustrates a flowchart of an exemplary method 800 for sending a payment between two users of a messaging system. The method 800 may include an act 802 of receiving a payment message from a first client device 204a associated with a sender, the payment message defining a payment from the sender to a recipient. In particular, act 802 can comprise receiving, at a server device 206 having at least one processor, a payment message from a first client device 204a associated with a sender, the payment message defining a payment from the sender to a recipient. For example, a sender may use the messaging application 230a to define a payment to a recipient, and in response, the messaging application 230a can generate and send a payment message to the server device 206 that supports a message system 210.

The method 800 may also include an act 804 of providing a recipient status message 560 for display within a message thread 506 on the second client device 204b, the recipient status message 560 comprising recipient transaction information. In particular, act 804 can comprise providing, by the server device 206 to a second client device 204b associated with the recipient, a recipient status message 560 for display within a message thread 508 on the second client device 204b, the recipient status message comprising recipient transaction information corresponding to the payment. In one or more embodiments, the recipient transaction information can include the payment amount, the payment sender, the payment status, and additional payment information as described in detail above.

The method 800 may further include an act 806 of providing a sender status message 550 for display within a message thread 506 on the first client device 204a, the sender status message 550 comprising sender transaction information. In particular, act 806 can comprise providing, by the server device to the first client device 204a, a sender status message 550 for display within a message thread 508 on the first client device 204a, the sender status message 550 comprising sender transaction information corresponding to the payment. In one or more embodiments, the sender transaction information can include the payment amount, the recipient, the payment status, and additional information as described in detail above.

Moreover, the method 800 may include an act 808 of identifying a status of a transaction by which the payment from the sender to the recipient is processed. In particular, act 808 can comprise identifying, using the at least one processor of the server device 206, a status of a transaction by which the payment from the sender to the recipient is processed. For example, the message system 210 can communicate with a payment network 215 to identify the status of one or more stages or processes of a transaction.

The method 800 may also include an act 810 of providing a status update to the second client device 204b that updates the recipient transaction information within the recipient status message 560. In particular, act 810 can comprise, based on identifying the status of the transaction, sending a status update to the second client device 204b that updates the recipient transaction information within the recipient status message 560. In one or more embodiments, for example, the message system 210 can send a status update upon authorizing a payment, funding a payment, canceling a payment, identifying an error, and/or any identifiable event during a payment process.

FIG. 9 illustrates a flowchart of an exemplary method 900 for sending a payment between two users of a messaging system. The method 900 may include an act 902 of providing a graphical user interface 504 comprising a message thread 506 and a selectable payment element 514. In particular, act 902 can comprise providing, via a display of a mobile device 550a, a graphical user interface 504 comprising a message thread 506 with a plurality of electronic messages 508 exchanged between a sender associated with the mobile device 500a and a recipient, the graphical user interface 504 further comprising a selectable payment element 514. In one more embodiments, a messaging application 230a can provide the graphical user interface 504.

Additionally, the method 900 may include an act 904 of providing one or more graphical elements 520-526 to allow the sender to define a payment to send to the recipient. In particular, act 904 can comprise providing, via the display of the mobile device 500a and in response to the sender interacting with the selectable payment element 514, one or more graphical elements 520-526 to allow the sender to specify payment information that defines a payment from the sender to the recipient. For example, and as described above in detail, the graphical user interface 504 can include graphical elements to allow a user to define one or more recipients, payment amounts, payment methods, etc.

Furthermore the method 900 may include an act 906 of sending a payment message including payment information that defines the payment. In particular, act 906 can comprise sending, to a message system, a payment message including the payment information that defines the payment from the sender to the recipient. For example, the messaging application 230a can generate a payment message that includes payment details specified by the sender.

The method 900 may also include an act 908 of receiving a status message 550 comprising transaction information corresponding to a transaction that facilitates the payment from the sender and the recipient. In particular, act 908 can comprise receiving, from the message system 210, a status message comprising transaction information corresponding to a transaction that facilitates the payment between the sender and the recipient. In one or more embodiments, the messaging application 230a can generate a payment message that includes payment details specified by the sender.

The method 900 may also include an act 910 of providing the status message 550 within the message thread 506 of the graphical user interface 504. In particular, act 910 can comprise providing, via the display of the mobile device 550a, the status message 550 within the message thread 506 of the graphical user interface 504. For example, the status message 550 can include a payment amount, a user defined message, selectable elements, and other payment information described in detail above.

One or more embodiments may comprise or utilize a special purpose or general-purpose computer including computer hardware, such as, for example, one or more processors and system memory, as discussed in greater detail below. Embodiments may also include physical and other computer-readable media for carrying or storing computer-executable instructions and/or data structures. In certain particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, example embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the disclosure can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Figure 10:
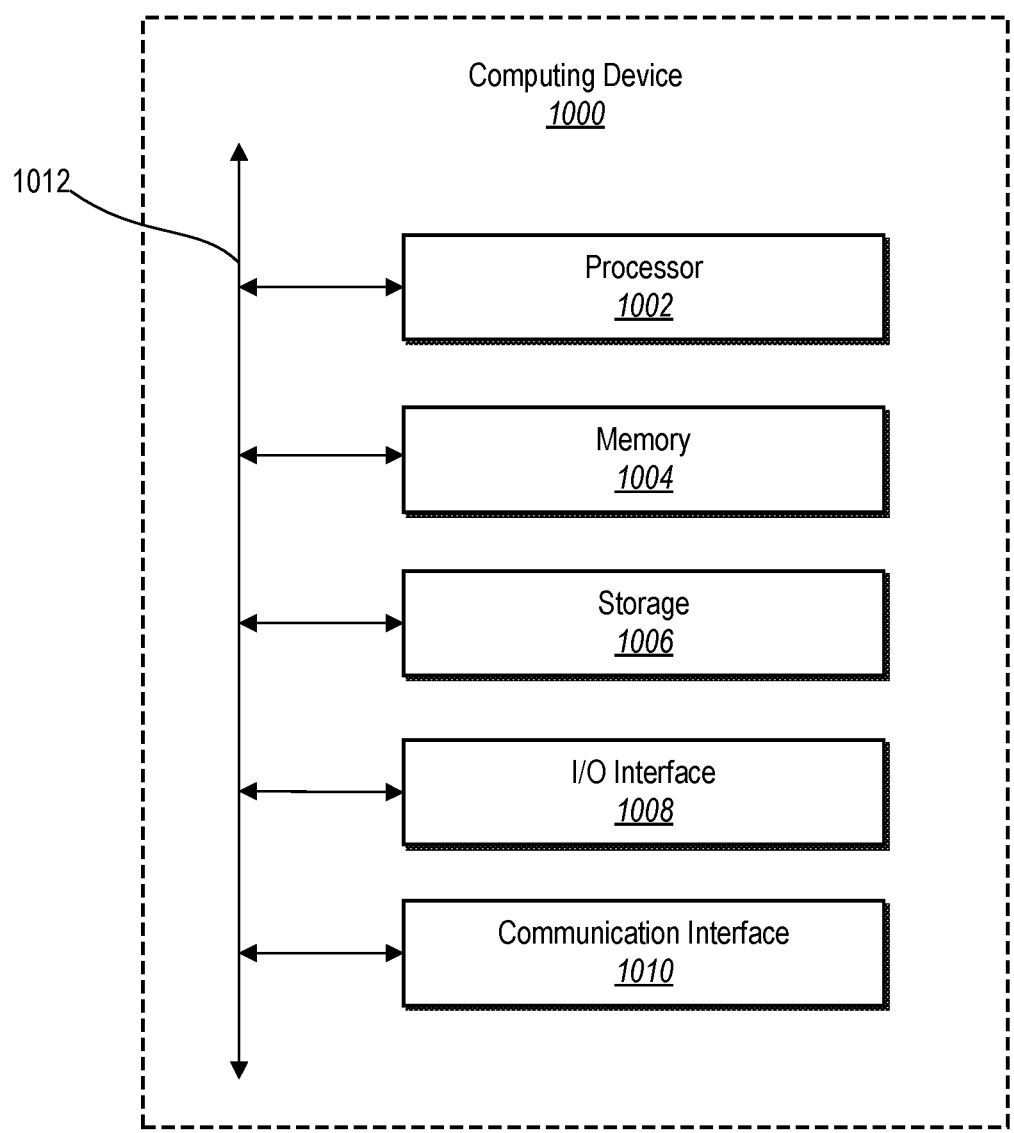
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the client devices 104 and 204, server devices of the server device 110 and/or 206, and server devices of the payment network 115 and/or 215 can each include implementations of the data-computing device 1000. As shown by FIG. 10, the computing device can include a processor 1002, memory 1004, a storage device 1006, an I/O interface 1008, and a communication interface 1010. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them. In particular embodiments, processor(s) 1002 may include one or more internal caches for data, instructions, or addresses. As an example and not by way of limitation, processor(s) 1002 may include one or more instruction caches, one or more data caches, and one or more translation lookaside buffers (TLBs). Instructions in the instruction caches may be copies of instructions in memory 1004 or storage 1006.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can include a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In particular embodiments, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1000 also includes one or more input or output ("I/O") devices/interfaces 1008, which are provided to allow a user to provide input to, receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 900 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1010. As an example and not by way of limitation, computing device 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1000 may include any suitable communication interface 1010 for any of these networks, where appropriate.

The computing device 1000 can further include a bus 1012. The bus 1012 can include hardware, software, or both that couples components of computing device 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the message system 210 can be integrated as part of a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users The social-networking system may store records of users and relationships between users in a social graph comprising a plurality of nodes and a plurality of edges connecting the nodes. The nodes may include a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may include information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 11:
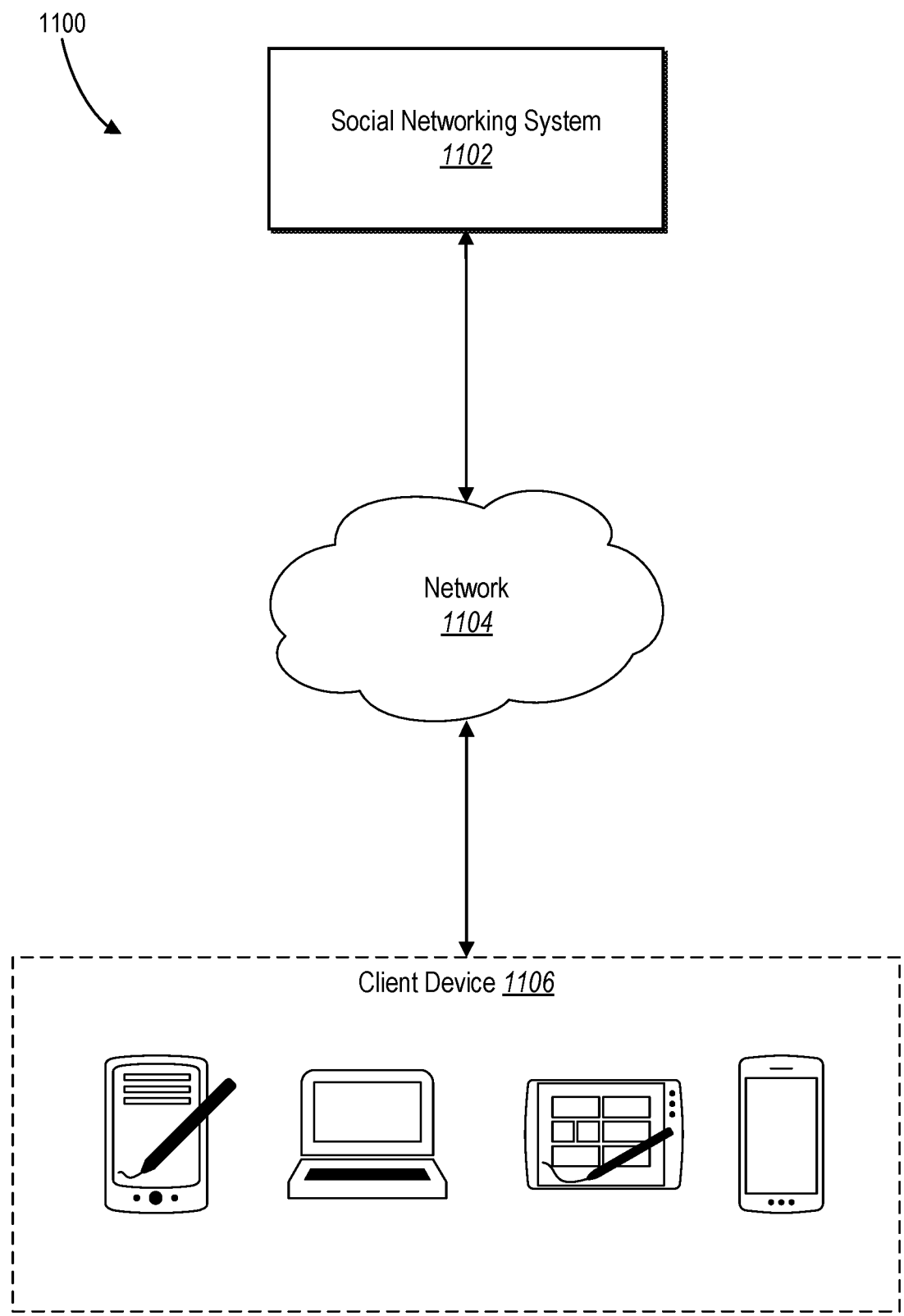
FIG. 11 is an example network environment of a social networking system in accordance with one or more embodiments.

FIG. 11 illustrates an example network environment of a social-networking system. In particular embodiments, a social-networking system 1100 may include one or more data stores. In particular embodiments, the social-networking system 1100 may store a social graph comprising user nodes, concept nodes, and edges between nodes as described earlier. Each user node may include one or more data objects corresponding to information associated with or describing a user. Each concept node may include one or more data objects corresponding to information associated with a concept. Each edge between a pair of nodes may include one or more data objects corresponding to information associated with a relationship between users (or between a user and a concept, or between concepts) corresponding to the pair of nodes.

In particular embodiments, the social-networking system 1100 may include one or more computing devices (e.g., servers) hosting functionality directed to operation of the social-networking system. A user of the social-networking system 1100 may access the social-networking system 1100 using a client device such as client device 1106. In particular embodiments, the client device 1106 can interact with the social-networking system 1102 through a network 1104.

The client device 1106 may be a desktop computer, laptop computer, tablet computer, personal digital assistant (PDA), in- or out-of-car navigation system, smart phone or other cellular or mobile phone, or mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over a network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access the social-networking system 1100.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, the disclosure has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    receiving, at a message system comprising at least one server device, a payment message from a first client device associated with a sender, the payment message defining a payment from the sender to a recipient;
    providing, by the message system to a second client device associated with the recipient, a recipient status message for display within a message thread on the second client device, the recipient status message comprising information corresponding to the payment;
    providing, by the message system to the first client device, a sender status message for display within a message thread on the first client device, the sender status message comprising sender transaction information comprising a payment amount portion;
    initiating, utilizing a transaction identifier associated with the payment, a transaction to process the payment by sending a payment authorization request to a payment network;
    receiving, from the second client device, an indication that the recipient selected a decline payment option associated with the payment; and
    in response to receiving the indication that the recipient selected the decline payment option:
    sending, to the payment network, a request to cancel the payment authorization request; and
    sending a first status update to the first client device associated with the sender, the first status update causing an update to the sender status message within the message thread on the first client device to indicate the payment was declined.

2. The method of claim 1, wherein the recipient status message further comprises the decline payment option.

3. The method of claim 1, further comprising identifying, within the payment message, payment information that defines the payment from the sender to the recipient, the payment information comprising a sender identifier, a recipient identifier, and a payment amount.

4. The method of claim 3, further comprising:
    generating the transaction identifier associated with the payment;
    associating the transaction identifier with the identified payment information; and
    providing the transaction identifier within the sender status message and the recipient status message.

5. The method of claim 1, further comprising deleting transaction information associated with the payment in response to receiving the indication that the recipient selected the decline payment option associated with the payment.

6. The method of claim 1, further comprising receiving, from the payment network, a confirmation that the payment authorization request was canceled.

7. The method of claim 1, further comprising sending, in response to receiving the indication that the recipient selected the decline payment option associated with the payment, a second status update to the second client device associated with the recipient, the second status update causing an update to the recipient status message within the message thread on the second client device to indicate the payment was declined.

8. A non-transitory computer readable medium comprising instructions that, when executed by at least one processor, cause a computer device to:
    receive, at a message system comprising at least one server device, a payment message from a first client device associated with a sender, the payment message defining a payment from the sender to a recipient;
    provide, by the message system to a second client device associated with the recipient, a recipient status message for display within a message thread on the second client device, the recipient status message comprising information corresponding to the payment;
    provide, by the message system to the first client device, a sender status message for display within a message thread on the first client device, the sender status message comprising sender transaction information comprising a payment amount portion;
    initiate, utilizing a transaction identifier associated with the payment, a transaction to process the payment by sending a payment authorization request to a payment network;
    receive, from the second client device, an indication that the recipient selected a decline payment option associated with the payment; and in response to receiving the indication that the recipient selected the decline payment option:
  send, to the payment network, a request to cancel the payment authorization request; and
  send a first status update to the first client device associated with the sender, the first status update causing an update to the sender status message within the message thread on the first client device to indicate the payment was declined.

9. The non-transitory computer readable medium of claim 8, wherein the recipient status message further comprises the decline payment option.

10. The non-transitory computer readable medium of claim 8, further comprising instructions that, when executed by the at least one processor, cause the computer device to identify, within the payment message, payment information that defines the payment from the sender to the recipient, the payment information comprising a sender identifier, a recipient identifier, and the payment amount.

11. The non-transitory computer readable medium of claim 10, further comprising instructions that, when executed by the at least one processor, cause the computer device to:
  generate the transaction identifier associated with the payment;
  associate the transaction identifier with the identified payment information; and
  provide the transaction identifier within the sender status message and the recipient status message.

12. The non-transitory computer readable medium of claim 8, further comprising instructions that, when executed by the at least one processor, cause the computer device to delete transaction information associated with the payment in response to receiving the indication that the recipient selected the decline payment option associated with the payment.

13. The non-transitory computer readable medium of claim 8, further comprising instructions that, when executed by the at least one processor, cause the computer device to receive, from the payment network, a confirmation that the payment authorization request was canceled.

14. The non-transitory computer readable medium of claim 8, further comprising instructions that, when executed by the at least one processor, cause the computer device to send, in response to receiving the indication that the recipient selected the decline payment option associated with the payment, a second status update to the second client device associated with the recipient, the second status update causing an update to the recipient status message within the message thread on the second client device to indicate the payment was declined.

15. A system comprising:
  at least one processor; and
  a non-transitory computer readable medium comprising instructions that, when executed by the at least one processor, cause the system to:
  receive, at a message system comprising at least one server device, a payment message from a first client device associated with a sender, the payment message defining a payment from the sender to a recipient;
  provide, by the message system to a second client device associated with the recipient, a recipient status message for display within a message thread on the second client device, the recipient status message comprising information corresponding to the payment;
  provide, by the message system to the first client device, a sender status message for display within a message thread on the first client device, the sender status message comprising sender transaction information comprising a payment amount portion;
  initiate, utilizing a transaction identifier associated with the payment, a transaction to process the payment by sending a payment authorization request to a payment network;
  receive, from the second client device, an indication that the recipient selected a decline payment option associated with the payment; and
  in response to receiving the indication that the recipient selected the decline payment option:
  send, to the payment network, a request to cancel the payment authorization request; and
  send a first status update to the first client device associated with the sender, the first status update causing an update to the sender status message within the message thread on the first client device to indicate the payment was declined.

16. The system of claim 15, wherein the recipient status message further comprises the decline payment option.

17. The system of claim 15, further comprising instructions that, when executed by the at least one processor, cause the system to identify, within the payment message, payment information that defines the payment from the sender to the recipient, the payment information comprising a sender identifier, a recipient identifier, and the payment amount.

18. The system of claim 17, further comprising instructions that, when executed by the at least one processor, cause the system to:
  generate the transaction identifier associated with the payment;
  associate the transaction identifier with the identified payment information; and
  provide the transaction identifier within the sender status message and the recipient status message.

19. The system of claim 15, further comprising instructions that, when executed by the at least one processor, cause the system to delete transaction information associated with the payment in response to receiving the indication that the recipient selected the decline payment option associated with the payment.

20. The system of claim 15, further comprising instructions that, when executed by the at least one processor, cause the system to send, in response to receiving the indication that the recipient selected the decline payment option associated with the payment, a second status update to the second client device associated with the recipient, the second status update causing an update to the recipient status message within the message thread on the second client device to indicate the payment was declined.

* * * * *